United States Patent [19]

Hefner, Jr. et al.

[11] Patent Number: 5,412,044
[45] Date of Patent: May 2, 1995

[54] NITRO GROUP TERMINATED MESOGENIC EPOXY RESIN ADDUCTS

[75] Inventors: Robert E. Hefner, Jr.; Jimmy D. Earls, both of Lake Jackson, Tex.

[73] Assignee: The Dow Chemical Company, Midland, Mich.

[21] Appl. No.: 241,883

[22] Filed: May 12, 1994

Related U.S. Application Data

[62] Division of Ser. No. 154,805, Nov. 18, 1993, Pat. No. 5,344,898, which is a division of Ser. No. 982,804, Nov. 30, 1992, Pat. No. 5,298,575.

[51] Int. Cl.$^6$ ............... C08G 59/00; C07C 205/19
[52] U.S. Cl. .................. 525/523; 525/533; 528/96; 528/97; 528/98; 528/99; 528/100; 528/101; 528/102; 528/103; 528/103.5; 528/104; 528/106; 528/109; 528/114; 528/116; 528/117; 528/118; 528/121; 528/122; 528/123; 528/124; 528/374; 528/407; 568/586
[58] Field of Search ............ 528/99, 96-98, 528/100-104, 106, 109, 114, 116-118, 121-124, 374, 407; 525/523, 533; 568/586

[56] References Cited

U.S. PATENT DOCUMENTS

| | | |
|---|---|---|
| 2,712,001 | 6/1955 | Greenlee . |
| 3,291,775 | 12/1966 | Holm . |
| 3,386,953 | 6/1968 | Dunnlag et al. . |
| 3,484,408 | 12/1969 | Holm . |
| 3,784,516 | 1/1974 | Baxter et al. . |
| 3,919,317 | 11/1975 | Huff et al. . |
| 4,480,082 | 10/1984 | McLean et al. . |
| 4,594,373 | 6/1986 | Kohli . |
| 4,611,046 | 9/1986 | Chattha . |
| 4,636,535 | 1/1987 | Wang et al. . |
| 4,645,803 | 2/1987 | Kohli et al. . |
| 4,663,401 | 5/1987 | Saito et al. . |
| 4,717,674 | 1/1988 | Sung . |
| 4,762,901 | 8/1988 | Dhein et al. . |
| 4,791,154 | 12/1988 | Corley et al. . |
| 5,021,471 | 6/1991 | Treybig . |
| 5,093,471 | 3/1992 | West . |

FOREIGN PATENT DOCUMENTS

| | | |
|---|---|---|
| 0478918A2 | 4/1992 | European Pat. Off. . |
| 4217660 | 8/1992 | Japan . |
| 92/18460 | 10/1992 | WIPO . |

OTHER PUBLICATIONS

*Indian Journal of Technology,* Varma and Kothari, vol. 21, pp. 265-267; Jul. 1983.
*Die Angewandte Makromolekulare Chemie,* Eichler and Mleziva, vol. 19, p. 239 pp. 31 to 55 (1971).
*Zeitschrift fur Polymerforschung,* Dobas and Eichler, 28, 11/12, pp. 589 to 594 (1977).
*J. Appl. Polym. Sci.,* Chattha, et al., 1987, 33(5), 1829-34.
Derwent Abstract 85-173653/29 (J60/101, 113-A).
*Polymer Reprints,* C. Lin and L. -C. Chien, vol. 31, No. 2, pp. 665-666. Aug. 1990. "Side-Chain Liquid Crystal Epoxy Polymers".

*Primary Examiner*—John C. Bleutge
*Assistant Examiner*—D. R. Wilson

[57] ABSTRACT

Adducts containing terminating nitro (nitroso) groups and one or more mesogenic moieties are prepared by reacting (A) at least one compound containing an average of more than one vicinal epoxide group per molecule with (B) at least one compound containing one or more nitro (nitroso) groups and an average of one reactive hydrogen atom per molecule; with the proviso that at least one member of components (A) and (B) contains a mesogenic moiety. Reduction of these adducts provides amines which are useful as curing agents for epoxy resins.

17 Claims, No Drawings

NITRO GROUP TERMINATED MESOGENIC EPOXY RESIN ADDUCTS

CROSS-REFERENCE TO RELATED APPLICATIONS

This application is a division of application Ser. No. 08/154,805 filed Nov. 18, 1993 (now U.S. Pat. No. 5,394,898) which is a division of application Ser. No. 07/982,804 filed Nov. 30, 1992 (now U.S. Pat. No. 5,298,575) all of which are incorporated herein by reference in their entirety.

FIELD OF THE INVENTION

The present invention concerns adducts of epoxy resins, which adducts contain terminating nitro (nitroso) groups as well as one or more mesogenic moieties.

BACKGROUND OF THE INVENTION

Application Ser. No. 07/562,289 filed Aug. 3, 1990 (now U.S. Pat. No. 5,276,184) teaches the preparation of adducts of epoxy resins and active hydrogen containing compounds, one or both of which contain one or more mesogenic moieties, as well as thermosettable compositions containing one or more of said adducts and products resulting from curing curable compositions thereof. In that invention, a plurality of active hydrogens (at least two or more) are required to be present in the active hydrogen containing compounds used to prepare the epoxy resin adducts. Thus, the active hydrogens of the active hydrogen containing compounds used in the preparation of the adducts, react, in part, with the epoxy groups of an epoxy resin also used in the preparation of the adducts and remain, in part, unreacted for future use as reactive moieties in a curable composition. When used to cure an epoxy resin, the mesogen-containing epoxy resin adducts of that invention provide cured products possessing substantial enhancement of physical and mechanical properties.

The present invention provides nitro (nitroso) group terminated adducts of epoxy resins prepared via reaction of an epoxy resin with a single active hydrogen containing compound which simultaneously contains one or more nitro (nitroso) groups. The resultant adducts of the present invention thus contain nitro (nitroso) terminating groups with no active hydrogen contributed by the single active hydrogen containing compound used to prepare said adduct. The advantages of the nitro terminated mesogen-containing adducts of the represent invention are multiple: A.) Reduction of the nitro groups provides a primary amine terminated adduct free of the chain extension (advancement) and/or branching potentially encountered if an aminophenol and an epoxy resin are reacted directly in an attempt to obtain the primary amine terminated adduct. B.) Reduction of the nitro groups provides exclusive primary amine termination in the adduct, whereas some extent of phenolic hydroxyl termination is likely if an aminophenol and an epoxy resin are reacted directly in an attempt to obtain the primary amine terminated adduct. Because of the higher reactivity of the amine group versus the phenolic hydroxyl group, the phenolic hydroxyl termination is, in fact favored under many conditions of reaction. If chain extension (advancement) through the primary amine group occurs (i.e., reaction of the primary amine hydrogens with two epoxide groups in separate epoxy resin molecules), a tertiary amine group becomes fixed in the adduct structure. C.) Functionalization of the backbone aliphatic hydroxyl groups, which result from epoxide ring opening by an active hydrogen containing compound to form an adduct, is very difficult in the presence of active hydrogen groups remaining in an adduct for future use as reactive moieties in a curable composition. By way of contrast, in the present invention, the nitro group terminated adducts with no active hydrogen contributed by the single active hydrogen containing compound used to prepare said adduct, may be functionalized through reaction of the backbone aliphatic hydroxyl groups without undesirable coreaction. The nitro groups present in the functionalized adduct are then reduced to provide primary amine termination for future use as reactive moieties in a curable composition. These amine terminated, functionalized adducts are preferred compositions of the present invention due to the liquid crystallinity often induced as a result of functionalization of the backbone aliphatic hydroxyl groups and improved processability resulting from lower melting temperatures.

SUMMARY OF THE INVENTION

The present invention concerns adducts containing terminating nitro ($-NO_2$) or nitroso ($-NO$), hereinafter designated as "nitro (nitroso)" groups and one or more mesogenic moieties which are prepared by reacting (A) one or more epoxy resins containing one or more mesogenic moieties, one or more epoxy resins free of mesogenic moieties, or mixtures thereof, and (B) at least one of (1) one or more single active hydrogen containing materials containing one or more nitro (nitroso) groups and one or more mesogenic moieties per molecule, (2) one or more single active hydrogen containing materials containing one or more nitro (nitroso) groups free of mesogenic moieties, or (3) a mixture of (1) and (2), with the proviso that one or more mesogenic moieties are present in either (A), the epoxy resin reactant or (B), the material containing one hydrogen which is reactive with an epoxide group or in both (A) and (B).

Another aspect of the present invention concerns adducts containing terminating nitro (nitroso) groups and one or more mesogenic moieties which have been partially or totally functionalized via reaction of a part or all of the backbone aliphatic hydroxyl groups.

Another aspect of the present invention concerns adducts containing terminating primary amine groups and one or more mesogenic moieties which have been partially or totally functionalized via reaction of a part or all of the backbone aliphatic hydroxyl groups.

Another aspect of the present invention concerns thermosettable (curable) mixtures of one or more of the aforesaid partially or totally functionalized adducts with one or more epoxy resins.

Another aspect of the present invention concerns the product resulting from thermosetting (curing) one or more of the aforesaid thermosettable (curable) mixtures.

A further aspect of the present invention pertains to products resulting from orienting any of the aforesaid thermosettable (curable) mixtures.

The term "mesogenic" as is used herein designates compounds containing one or more rigid rod-like structural units which have been found to favor the formation of liquid crystal phases in the case of low molar mass substances. Thus the mesogen or mesogenic moiety is that structure responsible for molecular ordering. The term "mesogenic" is further defined by R. A. Weiss (ed.) and C. K. Ober (ed.) in *Liquid-Crystalline Polymers*, ACS Symposium Series 435 (1989) on page 2: "The rigid unit responsible for the liquid crystalline behavior is referred to as the mesogen," and "Liquid crystalline order is a consequence solely of molecular shape anisotropy, such as found in rigid rod-shaped molecules . . . " Further definition of the term "mesogenic" may be found in *Polymeric Liquid Crystals*, Alexandre Blumstein (ed.), (1983) on pages 2-3 and in *Polymeric Liquid Crystals*, A. Ciferri, W. R. Krigbaum and Robert B. Meyer (eds.) (1982) on pages 5-9, both of which are incorporated herein by reference.

DETAILED DESCRIPTION OF THE INVENTION

Epoxy Resin Component

Suitable epoxy resins which can be employed herein include essentially any epoxy-containing compound which contains an average of more than one vicinal epoxide group per molecule. The epoxide groups can be attached to any oxygen, sulfur or nitrogen atom or the single bonded oxygen atom attached to the carbon atom of a —CO—O— group in which said oxygen, sulfur or nitrogen atom or the carbon atom of the —CO—O— group is attached to an aliphatic, aromatic or cycloaliphatic hydrocarbon group which hydrocarbon group can be substituted with any inert substituent including, but not limited to, halogen atoms, preferably chlorine or bromine, nitro groups and the like or the oxygen, sulfur, nitrogen atom, or the single bonded oxygen atom attached to the carbon atom of a —CO—O— group can be attached to the terminal carbon atom of a compound containing an average of more than one —(—CHR$^a$—CHR$^a$)$_t$— group where each R$^a$ is independently hydrogen or an alkyl or haloalkyl group, containing from 1 to about 2 carbon atoms, with the proviso that only one R$^a$ group can be a haloalkyl group, and t has a value from 1 to about 100, preferably from 1 to about 20, more preferably from 1 to about 10, most preferably from 1 to about 5.

It should be understood that in those instances wherein it is required that the epoxy resin or epoxy-containing compound contain a mesogenic moiety that those epoxy resins or epoxy-containing compounds which do not contain a mesogenic moiety are not suitable for that particular purpose.

Particularly suitable epoxy resins which can be employed herein include those compounds having an average of more than one vicinal epoxide group per molecule, such as, for example, the glycidyl ethers or glycidyl amines represented by the following formulas

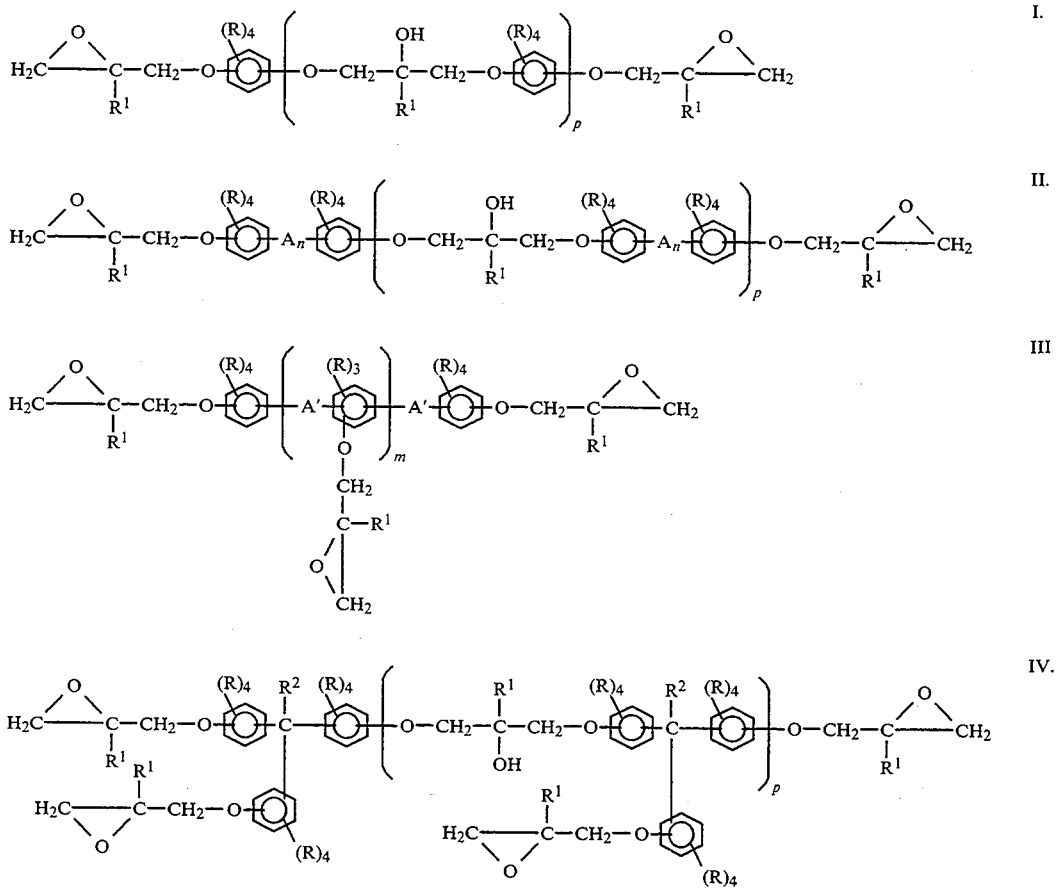

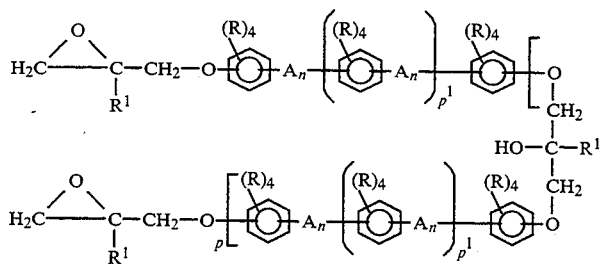

V.

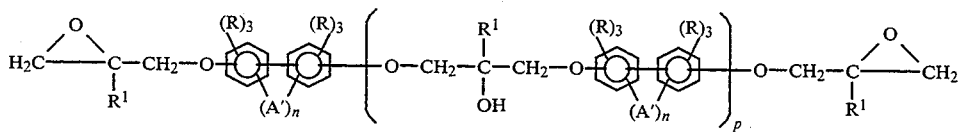

Formula VI.

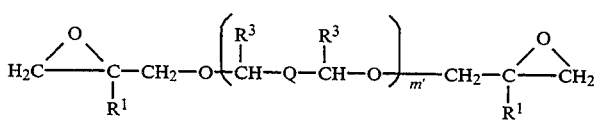

Formula VII.

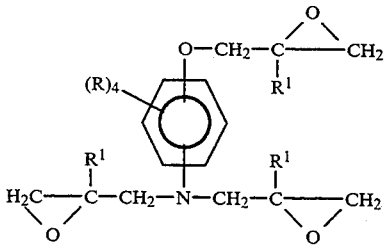

Formula VIII.

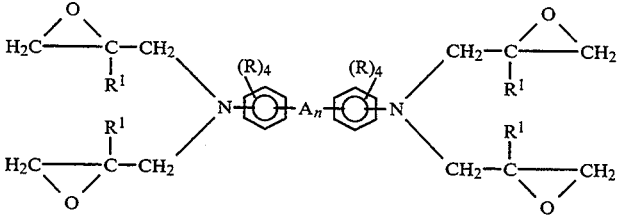

Formula IX.

wherein each A is independently a direct single bond, a divalent hydrocarbyl group having from 1 to about 20, preferably from 1 to about 14, carbon atoms, —O—, —CO—, —SO—, —SO$_2$—, —S—, —S—S—, —CR$^1$=CR$^1$, —C≡C—, —N=N—, —CR$^1$=N—, —O—CO—, —NR$^1$—CO—, —CR$^1$=N—N=CR$^1$—, —CR$^1$=CR$^1$—CO—, —N=CR$^1$—, —CO—O—, —CO—NR$^1$—, —CO—CR$^1$=CR$^1$—, —CO—O—N=CR$^1$—, —CR$^1$=N—O—OC—, —CO—NR$^1$—NR$^1$—OC—, —CR$^1$=CR$^1$—O—OC—, —CO—O—CR$^1$=CR$^1$—, —O—OC—CR$^1$=CR$^1$—, —CR$^1$=CR$^1$—CO—O—, —(CHR$^1$)$_{n'}$—O—CO—CR$^1$=CR$^1$—, —CR$^1$=CR$^1$—CO—O—(CHR$^1$)$_{n'}$—, —(CHR$^1$)$_{n'}$—CO—O—CR$^1$=CR$^1$—, —CR$^1$=CR$^1$—O—CO—(CHR$^1$)$_{n'}$—, —CO—S—, —S—OC—, —CH$_2$—CH$_2$—CO—O—, —O—OC—CH$_2$—CH$_2$—, —C≡C—C≡C—, —CR$^1$=CR$^1$—CR$^1$=CR$^1$—,

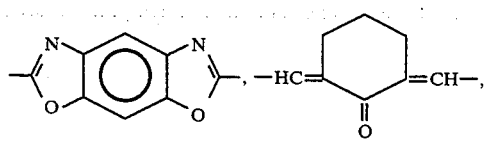

-continued

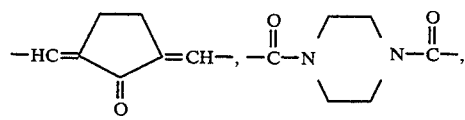

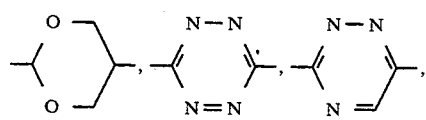

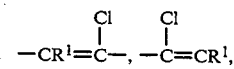

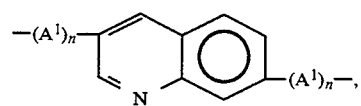

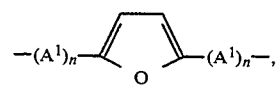

-continued

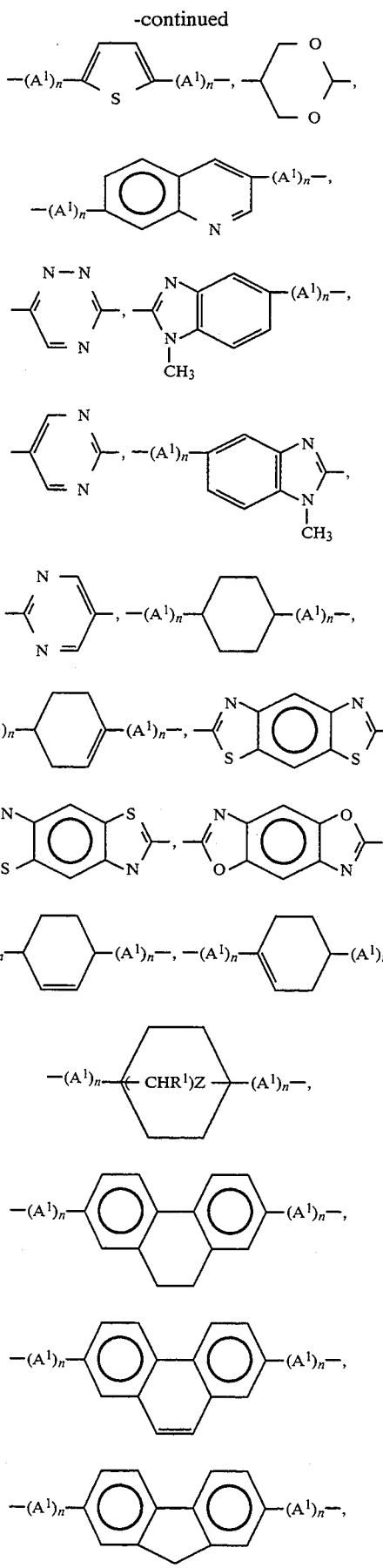

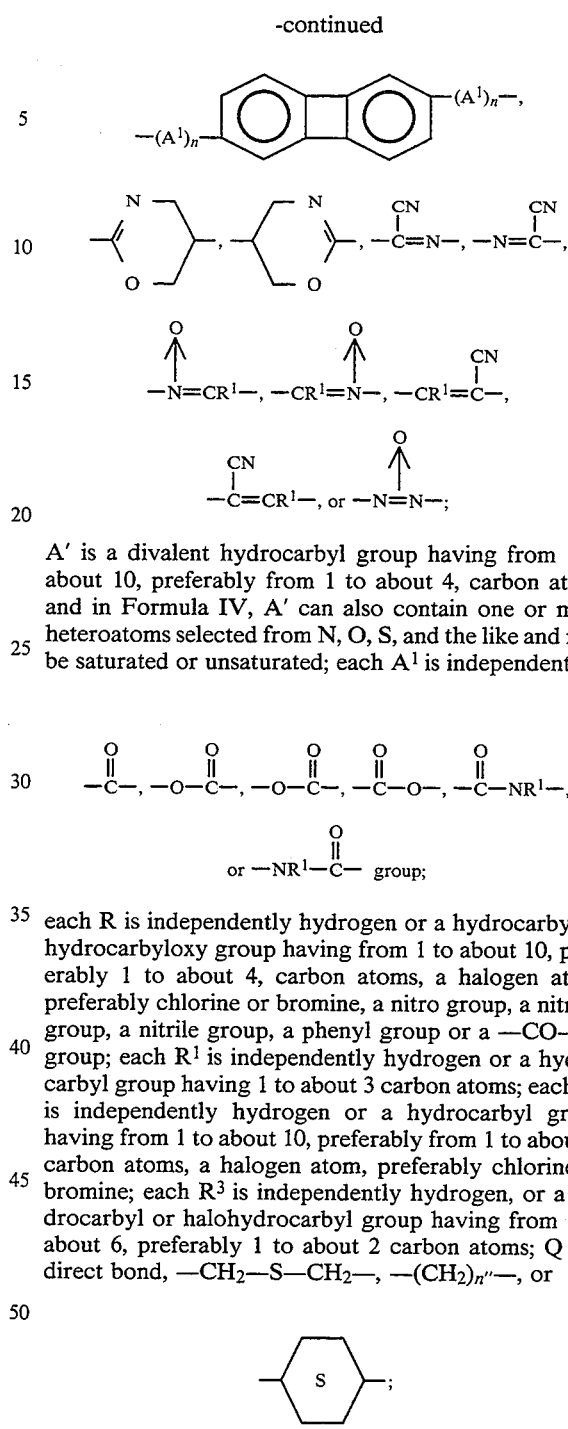

A' is a divalent hydrocarbyl group having from 1 to about 10, preferably from 1 to about 4, carbon atoms and in Formula IV, A' can also contain one or more heteroatoms selected from N, O, S, and the like and may be saturated or unsaturated; each $A^1$ is independently a $$-\overset{O}{\underset{\|}{C}}-, \ -O-\overset{O}{\underset{\|}{C}}-, \ -O-\overset{O}{\underset{\|}{C}}-, \ -\overset{O}{\underset{\|}{C}}-O-, \ -\overset{O}{\underset{\|}{C}}-NR^1-,$$

or $-NR^1-\overset{O}{\underset{\|}{C}}-$ group;

each R is independently hydrogen or a hydrocarbyl or hydrocarbyloxy group having from 1 to about 10, preferably 1 to about 4, carbon atoms, a halogen atom, preferably chlorine or bromine, a nitro group, a nitroso group, a nitrile group, a phenyl group or a $-CO-R^1$ group; each $R^1$ is independently hydrogen or a hydrocarbyl group having 1 to about 3 carbon atoms; each $R^2$ is independently hydrogen or a hydrocarbyl group having from 1 to about 10, preferably from 1 to about 3, carbon atoms, a halogen atom, preferably chlorine or bromine; each $R^3$ is independently hydrogen, or a hydrocarbyl or halohydrocarbyl group having from 1 to about 6, preferably 1 to about 2 carbon atoms; Q is a direct bond, $-CH_2-S-CH_2-$, $-(CH_2)_{n''}-$, or m has an average value from about 0.001 to about 6, preferably from about 0.01 to about 3; m' has a value from 1 to about 10 preferably from about 1 to about 4; n has a value of zero or one; p has a value from zero to about 30, preferably from zero to about 5; n' has a value from 1 to about 6, preferably 1 to about 3; n" has an average value from about 1 to about 10; z has a value of one or two; and $p^1$ has a value from 1 to about 30, preferably from 1 to about 3. The aromatic rings can also contain one or more heteroatoms selected from N, O, S and the like.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic or cycloaliphatic groups can be saturated or unsaturated. When applied to the A' group of Formula VI, the hydrocarbyl group can also contain one or more heteroatoms selected from N, O, S and the like. Likewise, the term hydrocarbyloxy means a hydrocarbyl group having an oxygen linkage between it and the carbon atom to which it is attached.

Representative of the polyepoxide compounds which are free of mesogenic or rodlike moieties include, for example, the diglycidyl ethers of resorcinol, 4,4'-isopropylidenediphenol (bisphenol A), 4,4'-dihydroxybenzophenone (bisphenol K), 1,1-bis(4-hydroxyphenyl)-1-phenylethane (bisphenol AP), dihydroxydiphenylmethane (bisphenol F), 3,3',5,5'-tetrabromobisphenol A, 4,4'-thiodiphenol (bisphenol S), 4,4'-sulfonyldiphenol, 4,4'-dihydroxydiphenyl oxide, 3-phenylbisphenol A, 3,3'5,5'-tetrachlorobisphenol A, 3,3'-dimethoxybisphenol A, dipropylene glycol, poly(propylene glycol)s, thiodiglycol; the triglycidyl ether of tris(hydroxyphenyl)methane; the triglycidyl ether of p-aminophenol; the tetraglycidyl ether of 4,4'-diaminodiphenylmethane; the polyglycidyl ether of a phenol or substituted phenol-aldehyde condensation product (novolac); the polyglycidyl ether of a dicyclopentadiene or an oligomer thereof and phenol or substituted phenol condensation product; the advancement reaction products of the aforesaid di- and polyglycidyl ethers with aromatic di- or polyhydroxyl- or di- or polycarboxylic acid containing compounds including, for example, bisphenol A (4,4'-isopropylidenediphenol), o-, m-, p-dihydroxybenzene, 2,4-dimethylresorcinol, 4-chlororesorcinol, tetramethylhydroquinone, 1,1-bis(4-hydroxyphenyl)ethane, bis(4,4'-dihydroxyphenyl)methane, 4,4'-dihydroxydiphenyl ether, 3,3',5,5'-tetramethyldihydroxydiphenyl ether, 3,3',5,5'-dichlorodihydroxydiphenyl ether, 4,4'-bis(p-hydroxyphenyl isopropyl)diphenyl ether, 4,4'-bis(p-hydroxyphenoxy)benzene, 4,4'-bis(p-hydroxyphenoxy)diphenyl ether, 4,4'-bis(4-hydroxyphenoxy)phenyl sulfone)diphenyl ether, 4,4'-dihydroxydiphenyl sulfone, 4,4'-dihydroxydiphenyl sulfide, 4,4'-dihydroxydiphenyl disulfide, 2,2'-dihydroxydiphenyl sulfone, 4,4'-dihydroxydiphenyl methane, 1,1-bis(p-hydroxyphenyl)cyclohexane, 4,4'-dihydroxybenzophenone, phloroglucinol, pyrogallol, 2,2',5,5'-tetrahydroxydiphenyl sulfone, tris(hydroxyphenyl)methane, dicyclopentadiene diphenol, tricyclopentadiene diphenol, terephthalic acid, isophthalic acid, p-hydroxybenzoic acid; mixtures thereof and the like.

The epoxy resins containing a mesogenic moiety which can particularly be employed herein include, for example, those represented by the aforementioned Formulas II, V, VI or IX wherein at least 80 percent of the molecules are para substituted by both the bridging groups (—A—) and the substituent containing the glycidyl group(s)

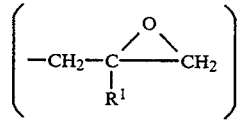

as well as the substituent containing the secondary hydroxy alkylidene group(s)

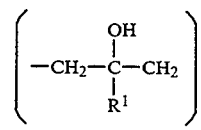

which are present when p or p¹ has a value greater than zero. For Formula VI, it is to be understood that para substitution is with respect to the direct bond between the aromatic rings.

The bridging groups (—A—) in the formulas for the epoxy resins containing mesogenic moieties form a rigid central linkage between the aromatic ring pairs, that is, A is a direct single bond, —C≡C—, —CR¹=N—, —N=N—, —O—CO—, —NR¹—CO—, —CR¹=N—N=CR¹—, —CR¹=CR¹—CO—, —CR¹=C-R¹—, —N=CR¹—, —CO—O—, —CO—NR¹—, —CO—CR¹=CR¹—, —CO—O—N=CR¹—, —CR¹=N—O—OC—, —CO—NR¹—NR¹—OC—, —CR¹=CR¹—O—OC—, —CO—O—CR¹=CR¹—, —O—OC—CR¹=CR¹—, —CR¹=CR¹—CO—O—, —(CHR¹)ₙ'—O—CO—CR¹=CR¹—, —CR¹=C-R¹—CO—O—(CHR¹)ₙ'—, —(CHR¹)-ₙ'—CO—O—CR¹=CR¹—, —CR¹=C-R¹—O—CO—(CHR¹)ₙ'—, —CO—S—, —S—OC—, —CH₂—CH₂—CO—O—, —O—OC—CH₂—CH₂—, —C≡C—C≡C—, —CR¹=CR¹—CR¹=CR¹—,

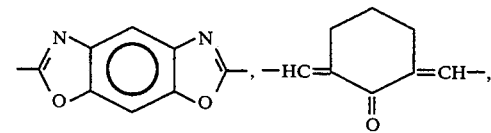

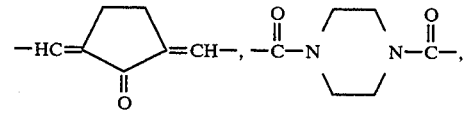

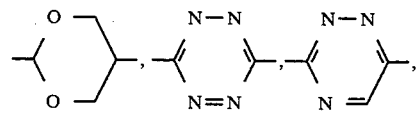

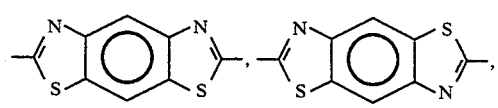

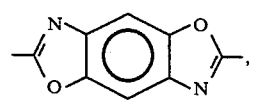

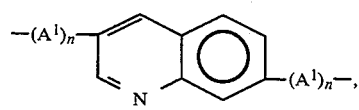

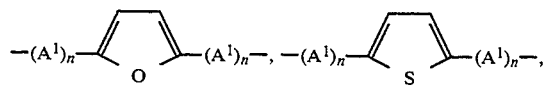

-continued

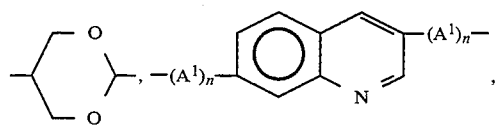

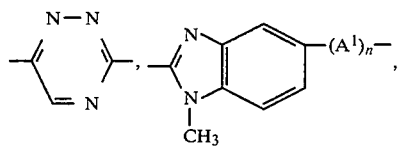

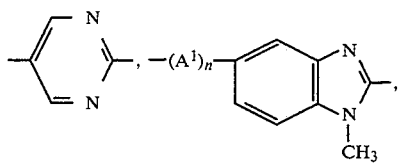

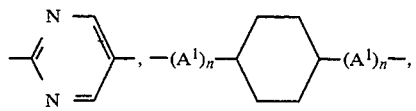

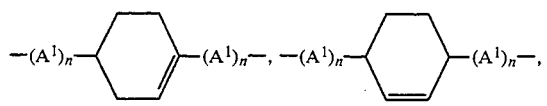

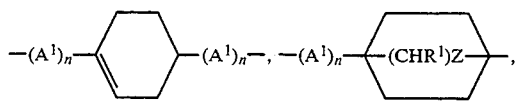

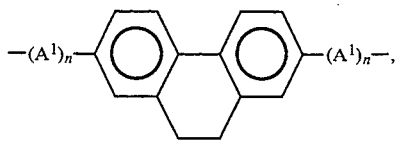

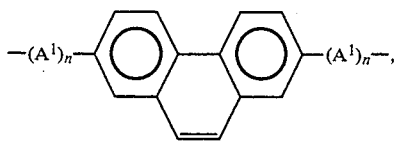

-continued

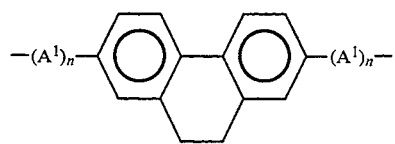

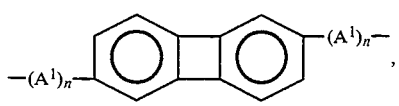

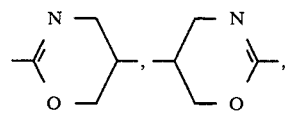

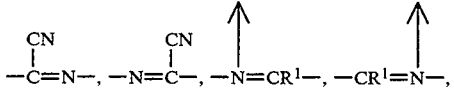

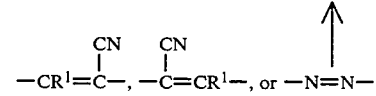

group and n, n', z, $A^1$ and $R^1$ are as hereinbefore described. To optimize the aspect ratio of said mesogenic or rodlike functionalities, it is preferred that the aromatic ring substituents (R in Formulas II, V, VI and IX) are hydrogen or methyl groups.

Representative polyepoxide compounds containing a mesogenic moiety include, for example, the diglycidyl ethers of 4,4'-dihydroxybiphenyl, 4,4'-dihydroxystilbene, 4,4 '-dihydroxydiphenylacetylene, 4,4'-dihydroxydiphenylazomethine, 4,4'-dihydroxyazobenzene, 4,4'-dihydroxyazoxybenzene, 4,4'-bis((4-hydroxy)phenoxy)-diphenyl, 4,4'-dihydroxy-alpha-methylstilbene, 3,3',5,5'-tetramethyl-4,4'-dihydroxydiphenyl, 3,3',5,5'-tetrachloro-4,4'-dihydroxydiphenyl, 2,2',6,6'-tetramethyl-4,4'-dihydroxydiphenyl, 4,4'-dihydroxybenzanilide, 4,4'-dihydroxychalcone, 4,4'-dihydroxy-alpha-cyanostilbene, 4-hydroxyphenyl-4-hydroxybenzoate, 4,4'-dihydroxy-3,3',5,5'-tetrabromo-alpha-methylstilbene, N,N'-bis(4-hydroxyphenyl)terephthalamide, the diglycidyl ethers of the dihydric phenols represented by the following formulas:

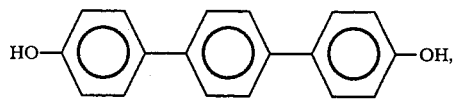

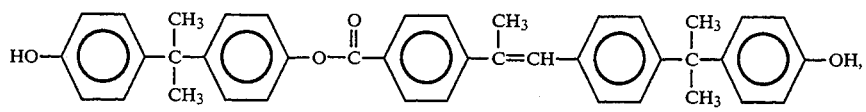

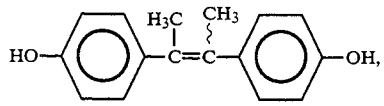

-continued
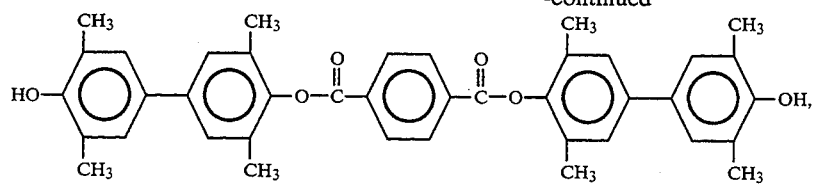
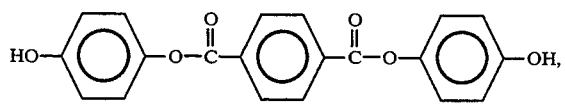
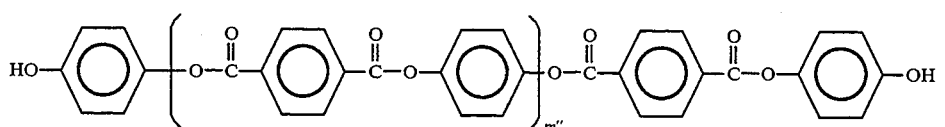
where m″ has a value from 1 to about 10,
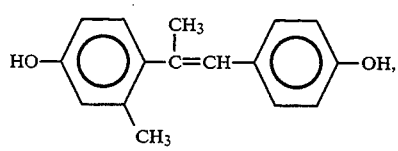
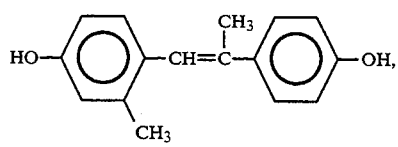
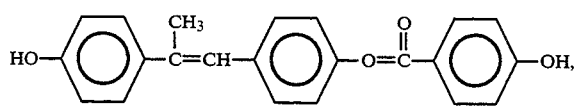
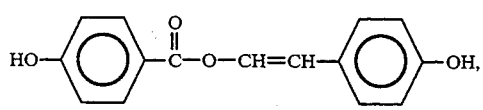
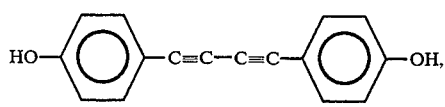
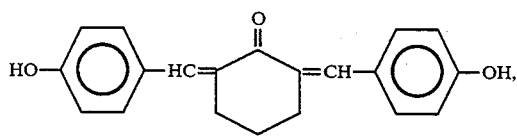
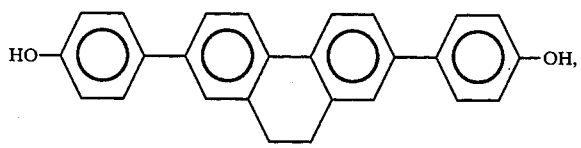

-continued
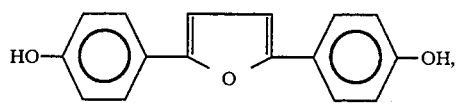
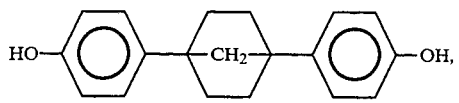
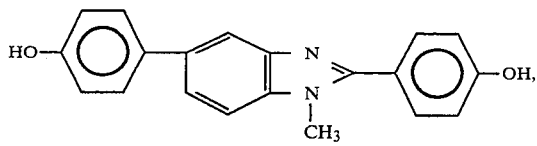
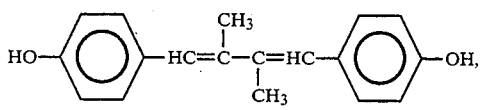
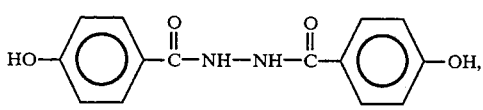
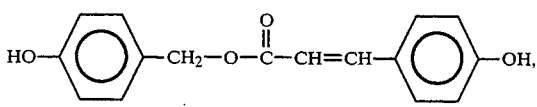
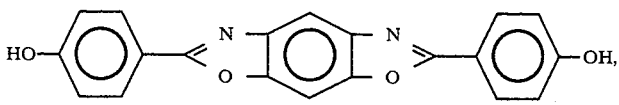
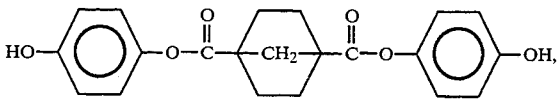
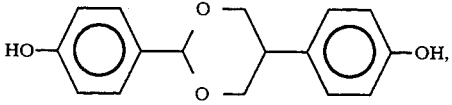
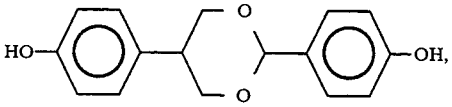
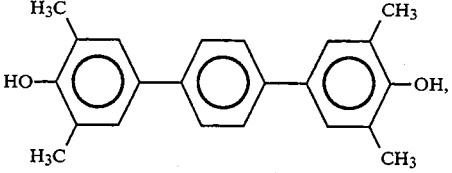
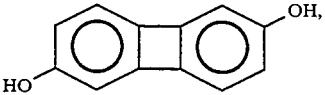

-continued
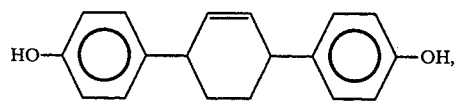
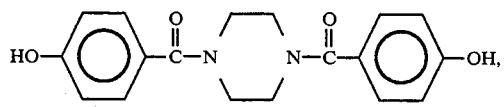
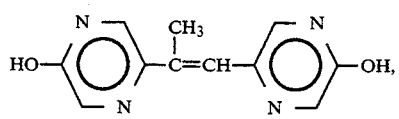
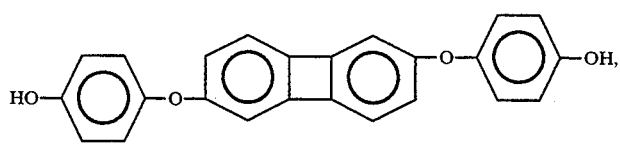
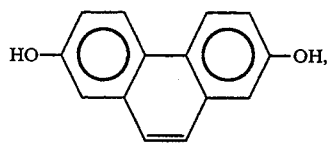
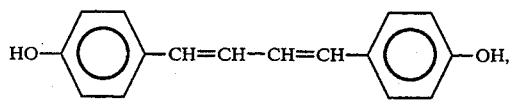
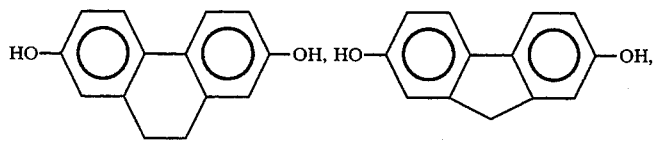
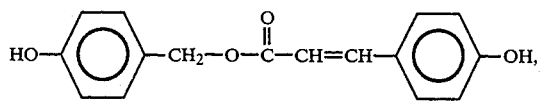
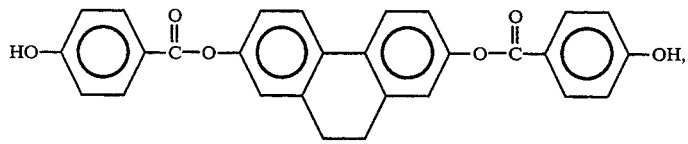
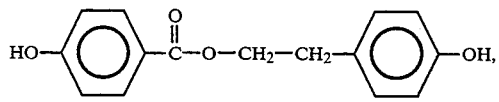
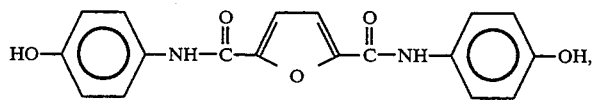
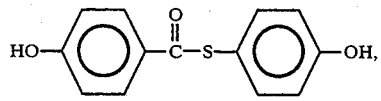

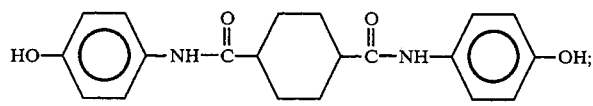

the tetraglycidyl amines of 4,4'-diamino-alpha-methylstilbene, 4,4'-diaminostilbene, 4,4'-diaminobenzanilide, 4,4'-diaminoazobenzene, 4,4'-diamino-alpha-cyanostilbene. Also suitable are the products resulting from advancing the aforementioned diglycidyl ethers with aromatic dihydroxyl or dicarboxylic acid containing compounds including, for example, all of the previously listed diphenol precursors to the diglycidyl ethers containing a mesogenic moiety; mixtures thereof and the like.

The epoxy resins which can be employed herein can be prepared by reacting the corresponding di- or polyhydroxyl containing compound (or amine containing compound) with an epihalohydrin by any suitable means known to those skilled in the art. Suitable such methods are disclosed by Lee and Neville in *Handbook of Epoxy Resins*, McGraw-Hill, (1967); Japan Kokai Tokyo Koho JP 62 86,484 (87 96, 484); EP 88-008358/92 and Journal of Applied Polymer Science, Vol. 23, 1355–1372 (1972) all of which are incorporated herein by reference.

Generally, the di- or polyhydroxyl containing compound is reacted with an epihalohydrin in the presence of a suitable catalyst and in the presence or absence of a suitable solvent at a temperature suitably from about 0° C. to about 100° C., more suitably from about 20° C. to about 80° C., most suitably from about 20° C. to about 65° C.; at pressures suitably from about 30 mm Hg vacuum to about 100 psia., more suitably from about 30 mm Hg vacuum to about 50 psia., most suitably from about atmospheric pressure to about 20 psia.; for a time sufficient to complete the reaction, usually from about 1 to about 12, more usually from about 1 to about 5, most usually from about 1 to about 3 hours; and using from about 1.5:1 to about 100:1, preferably from about 2:1 to about 50:1, most preferably from about 3:1 to about 20:1 moles of epihalohydrin per hydroxyl group. This initial reaction unless the catalyst is an alkali metal or alkaline earth metal hydroxide employed in stoichiometric quantities produces a halohydrin intermediate which is then reacted with a basic acting compound to convert the vicinal chlorohydrin groups to epoxide groups. The resultant product is a glycidyl ether compound.

Suitable epihalohydrins which can be employed to prepare the epoxy resins useful in the present invention include, for example, those represented by the following formula

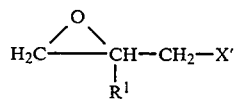

Formula X wherein $R^1$ is as previously defined; and X' is a halogen. Particularly suitable such epihalohydrins include, for example, epichlorohydrin, epibromohydrin, epiiodohydrin, methylepichlorohydrin, methylepibromohydrin, methylepiiodohydrin, combinations thereof and the like.

Suitable di- or polyhydroxyl containing compounds (or amine containing compounds) which can be employed to prepare the epoxy resins useful in the present invention include, for example, those represented by the formulas

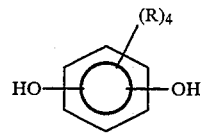

Formula XI.

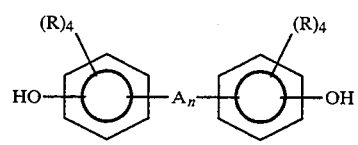

Formula XII.

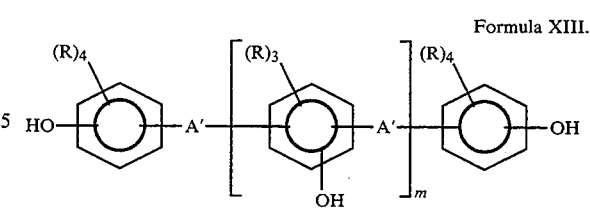

Formula XIII.

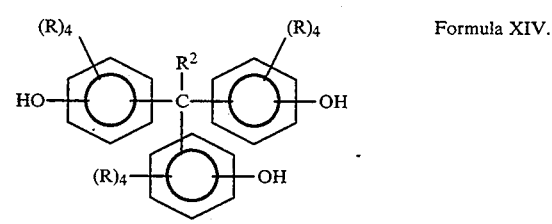

Formula XIV.

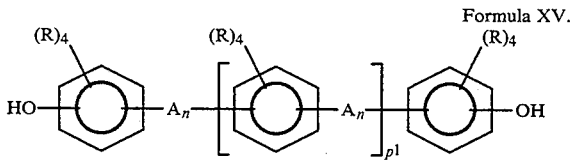

Formula XV.

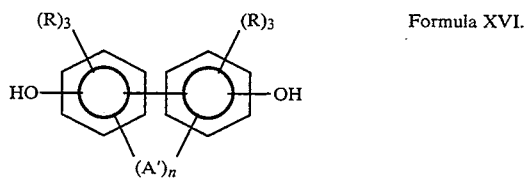

Formula XVI.

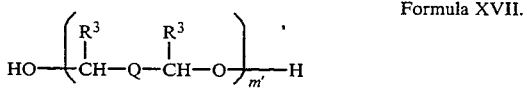

Formula XVII.

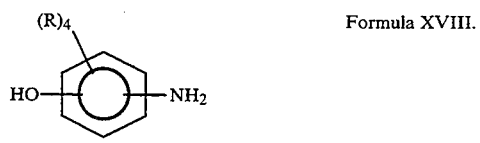

Formula XVIII.

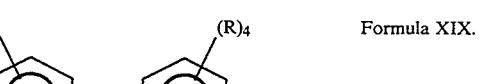

Formula XIX.

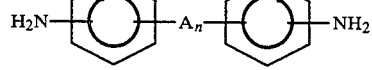

wherein R, $R^2$, $R^3$, Q, A, A' $p^1$, m and m' are as hereinbefore defined, and A' in Formula XVI can also contain one or more heteroatoms selected from N, O, S and the like and may be saturated or unsaturated.

Suitable catalysts which can be employed to prepare the epoxy resins which can be employed herein include, for example, ammonium halides such as, for example, benzyltrimethylammonium chloride, benzyltrimethylammonium bromide, tetrabutylammonium chloride, tetrabutylammonium bromide, tetraoctylammonium chloride, tetraoctylammonium bromide, tetramethylammonium chloride, tetramethylammonium bromide, combinations thereof and the like.

Suitable basic acting compounds which can be employed to prepare the epoxy resins useful herein include, for example, alkali metal or alkaline earth metal hydroxides, carbonates, bicarbonates and the like. Particularly suitable such compounds include, for example, sodium hydroxide, potassium hydroxide, lithium hydroxide, calcium hydroxide, barium hydroxide, magnesium hydroxide, manganese hydroxide, sodium carbonate, potassium carbonate, lithium carbonate, calcium carbonate, barium carbonate, magnesium carbonate, manganese carbonate, sodium bicarbonate, potassium bicarbonate, lithium bicarbonate, calcium bicarbonate, barium bicarbonate, magnesium bicarbonate, manganese bicarbonate, mixtures, thereof and the like. Most preferred is sodium hydroxide or potassium hydroxide.

Suitable solvents which can be employed herein include, for example, alcohols, aliphatic hydrocarbons, aromatic hydrocarbons, glycol ethers, amides, sulfoxides, sulfones, combinations thereof and the like. Particularly suitable solvents include, for example, methanol, ethanol, isopropanol, hexane, heptane, octane, nonane, decane, toluene, xylene, ethylene glycol methyl ether, ethylene glycol ethyl ether, ethylene glycol n-butyl ether, ethylene glycol phenyl ether, propylene glycol methyl ether, propylene glycol phenyl ether, tripropylene glycol methyl ether, diethylene glycol methyl ether, diethylene glycol ethyl ether, diethylene glycol n-butyl ether, diethylene glycol phenyl ether, butylene glycol methyl ether, N,N-dimethylformamide, N-methylpyrrolidinone, N,N-dimethylacetamide, dimethylsulfoxide, sulfolane, combinations thereof and the like.

The solvent is usually employed in amounts suitably from about 5 to about 95, more suitably from about 20 to about 60, most suitably from about 30 to about 40, percent by weight based upon the combined weight of solvent and epihalohydrin.

For the production of epoxy resins from di- and polyhydroxyl containing compounds (or amine containing compounds) possessing functional groups or linkages that are sensitive to hydrolysis under the reaction conditions employed in certain of the epoxidation chemistries, alternate techniques of preparation may be employed. As a typical example, U.S. Pat. No. 4,762,901 teaches preparation of the diglycidyl ether of the biphenol represented by the following formula

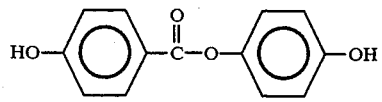

which is a compound containing an ester linkage known to be sensitive to hydrolysis, using an anhydrous epoxidation technique. This technique employs azeotropic removal of water/epichlorohydrin concurrent with the controlled addition of aqueous sodium hydroxide to a reaction mixture consisting of epichlorohydrin, a diphenol, a phase transfer catalyst such as, for example, benzyltrimethylammonium chloride, and optionally solvent(s). It is advantageous to conduct such anhydrous epoxidation reactions under a vacuum to facilitate the azeotropic removal of water. It is also operable and advantageous to utilize sodium hydroxide free of water as the alkali metal hydroxide reactant. In order to control reaction exotherm, the solid sodium hydroxide is typically added in aliquots as a powder to the epoxidation reaction mixture. A typical anhydrous epoxidation technique is described in U.S. Pat. No. 4,499,255 which is incorporated herein by reference in its entirety.

Another specific anhydrous epoxidation technique involves catalytic coupling of the di- or polyhydroxyl containing compound with an epihalohydrin, typically using as a catalyst one or more of the aforementioned ammonium halides. The resultant solution of halohydrin in excess epihalohydrin is then treated with finely pulverized potassium carbonate to effect dehydrohalogenation to the epoxy resin.

Advancement reaction of di- and polyglycidyl ethers can be performed by the known methods described in the aforementioned *Handbook of Epoxy Resins*. This usually includes combining one or more suitable compounds having an average of more than one active hydrogen atom per molecule, including, for example, dihydroxy aromatic, dithiol or dicarboxylic acid compounds or compounds containing one primary amine or amide group or two secondary amine groups and the di- or polyglycidyl ethers with the application of heat and mixing to effect the advancement reaction. A catalyst is frequently added to facilitate the advancement reaction.

The advancement of the epoxy resins containing one or more mesogenic moieties with compounds having an average of more than one active hydrogen per molecule is employed to linearly chain extend the resin so as to produce an advanced epoxy resin. This linear chain extension is required for some mesogen-containing resin compositions in order to obtain liquid crystal character. The advancement of the mesogenic epoxy resins can also be used to increase the temperature range in which a particular resin is liquid crystalline and to control the degree of crosslinking during the final curing stage.

The epoxy resin containing one or more mesogenic or rodlike moieties and the compound having an average of more than one active hydrogen atom per molecule are reacted in amounts which provide suitably from about 0.01:1 to about 0.99:1, more suitably from about 0.05:1 to about 0.9:1, most suitably from about 0.10:1 to about 0.50:1 active hydrogen atoms per epoxy group.

Particularly suitable compounds having an average of more than one active hydrogen atom per molecule which can be employed herein in the preparation of the advanced epoxy resins include hydroxyl-containing compounds, carboxylic acid-containing compounds and primary amine-containing compounds.

Particularly suitable hydroxyl-containing compounds include, for example, hydroquinone, bisphenol A, 4,4'-dihydroxydiphenylmethane, 4,4'-thiodiphenol, 4,4'-sulfonyldiphenol, 4,4'-dihydroxydiphenyl oxide, 4,4'-dihydroxybenzophenone, 1,1-bis(4-hydroxyphenyl)-1-phenylethane, 3,3',5,5'-tetrachlorobisphenol A, 3,3'-dimethoxybisphenol A, 4,4'-dihydroxybiphenyl, 4,4'-dihydroxy-α,α'-diethylstilbene, 4,4'-dihydroxy-α-methylstilbene, 4,4'-dihydroxybenzanilide, 4,4'-dihydroxy-2,2'-dimethylazoxybenzene, 4,4'-dihydroxy-α-cyanostilbene, bis(4-hydroxyphenyl)terephthalate, bis(N,N'-4-hydroxyphenyl)terephthalamide, bis(4'-hydroxybiphenyl)terephthalate, 4,4'-dihydroxyphenylbenzoate, bis(4'-hydroxyphenyl)-1,4-benzenediimine, 4,4''-dihydroxybiphenylbenzoate, 1,4-bis(4'-hydroxyphenyl-1'-carboxamide)benzene, 1,4-bis(4'-hydroxyphenyl-1'-carboxy)benzene, 4,4'-bis(4''-hydroxyphenyl-1''-carboxy)-biphenyl, mixtures thereof and the like.

Particularly suitable carboxylic acid-containing compounds include, for example, terephthalic acid, 4,4'-benzanilide dicarboxylic acid, 4,4'-phenylbenzoate dicarboxylic acid, 4,4'-stilbene-dicarboxylic acid and mixtures thereof and the like.

Particularly suitable primary amine-containing compounds include, for example, aniline, 4'-sulfonamido-N-phenyl benzamide, 4'-sulfonamido-N'-phenyl-4-chlorobenzamide, 4-amino-1-phenylbenzoate, 4-amino-N-phenylbenzamide, N-phenyl-4-amino-phenyl-1-carboxamide, phenyl-4-aminobenzoate, biphenyl-4-aminobenzoate, 1-phenyl-4'-aminophenylterephthalate, mixtures thereof and the like.

The advancement reaction can be conducted in the presence of a suitable advancement catalyst such as, for example, phosphines, quaternary ammonium compounds, phosphonium compounds, tertiary amines and the like. Particularly suitable catalysts include, for example, ethyltriphenylphosphonium chloride, ethyltriphenylphosphonium bromide, ethyltriphenylphosphonium iodide, ethyltriphenylphosphonium diacetate (ethyltriphenylphosphonium acetate.acetic acid complex), ethyltriphenylphosphonium phosphate, tetrabutylphosphonium chloride, tetrabutylphosphonium bromide, tetrabutylphosphonium iodide, tetrabutylphosphonium diacetate (tetrabutylphosphonium acetate.acetic acid complex), butyltriphenylphosphonium tetrabromobisphenate, butyltriphenylphosphonium bisphenate, butyltriphenylphosphonium bicarbonate, benzyltrimethylammonium chloride, tetramethylammonium hydroxide, triethylamine, tripropylamine, tributylamine, 2-methylimidazole, benzyldimethylamine, mixtures thereof and the like. Many of these catalysts are described in U.S. Pat. Nos. 3,306,872; 3,341,580; 3,379,684; 3,477,990; 3,547,881; 3,637,590; 3,843,605; 3,948,855; 3,956,237; 4,048,141; 4,093,650; 4,131,633; 4,132,706; 4,171,420; 4,177,216; and 4,366,295, all of which are incorporated herein by reference.

The amount of advancement catalyst depends, of course, upon the particular reactants and catalyst employed; however, it is usually employed in quantities of from about 0.03 to about 3, preferably from about 0.03 to about 1.5, most preferably from about 0.05 to about 1.5 percent by weight based upon the weight of the epoxy containing compound.

The advancement reaction can be conducted at atmospheric, superatmospheric or subatmospheric pressures at temperatures of from about 20° C. to about 260° C., preferably from about 80° C. to about 240° C., more preferably from about 100° C. to about 200° C. The time required to complete the advancement reaction depends upon the temperature employed. Higher temperatures require shorter periods of time whereas lower temperatures require longer periods of time. Generally, however, times of from about 5 minutes to about 24 hours, preferably from about 30 minutes to about 8 hours, more preferably from about 30 minutes to about 3 hours are suitable.

If desired, the advancement reaction can be conducted in the presence of one or more solvents. For the production of advanced epoxy resins using a reactant which is of low solubility in the di- or polyglycidyl ether reactant, it is frequently of advantage to add one or more solvents to the reaction mixture. Suitable such solvents include, for example, glycol ethers, aliphatic and aromatic hydrocarbons, aliphatic ethers, cyclic ethers, ketones, esters, amides, combinations thereof and the like. Particularly suitable solvents include, for example, toluene, benzene, xylene, methyl ethyl ketone, methyl isobutyl ketone, diethylene glycol methyl ether, dipropylene glycol methyl ether, dimethylformamide, dimethylsulfoxide, N-methypyrrolidinone, tetrahydrofuran, propylene glycol methyl ether, combinations thereof and the like. The solvents can be employed in amounts of from about zero to about 80%, preferably from about 20% to about 60%, more preferably from about 30% to about 50% by weight based upon the weight of the reaction mixture. Care should be taken to utilize only those solvents which are inert to reaction with any of the reactants employed in the advancement reaction or the product formed therefrom.

Single Active Hydrogen and Nitro (Nitroso) Group Containing Component

Materials containing a single active hydrogen which is reactive with an epoxide group and one or more nitro (nitroso) groups useful in the preparation of the nitro (nitroso) group terminated epoxy resin adducts containing one or more mesogenic moieties of the present invention include the nitro and nitroso phenols, such as, for example, those represented by Formula XX where Y is a —OH group and one or more of the groups represented by R is a nitro or nitroso group and by Formulas XXI, XXIII and XIV, where one Y is a —OH group and the other Y becomes a R group and one or more of the groups represented by R is a nitro or nitroso group and by Formula XXII where one Y is a —OH group and the other two Y groups become R groups and one or more of the groups represented by R is a nitro or nitroso group; the nitro and nitroso carboxylic acids, such as, for example, those represented by Formula XX where Y is a —COOH group and one or more of the groups represented by R is a nitro or nitroso group and by Formulas XXI, XXIII and XIV, where one Y is a —COOH group and the other Y becomes a R group and one or more of the groups represented by R is a nitro or nitroso group and by Formula XXII where one Y is a —COOH group and the other two Y groups become R groups and one or more of the groups represented by R is a nitro or nitroso group; the nitro and nitroso mercaptans, such as, for example, those represented by Formula XX where Y is a —SH group and one or more of the groups represented by R is a nitro or nitroso group and by Formulas XXI, XXIII and XIV, where one Y is a —SH group and the other Y becomes a R group and one or more of the groups represented by R is a nitro or nitroso group and by Formula XXII where one Y is a —SH group and the other two Y groups become R groups and one or more of the groups represented by R is a nitro or nitroso group; the nitro and nitroso secondary monoamines, such as, for example, those represented by Formula XX where Y is a —NHR$^4$ group and the other Y becomes a R group and one or more of the groups represented by R is a nitro or nitroso group and by Formulas XXI, XXIII and XIV, where one Y is a —NHR$^4$ group and the other Y becomes a R group and one or more of the groups represented by R is a nitro or nitroso group and by Formula XXII where one Y is a —NHR$^4$ group and the other two Y groups become R groups and one or more of the groups represented by R is a nitro or nitroso group and R$^4$ is a hydrocarbyl group having from 1 to about 12, preferably from 1 to about 2 carbon atoms; wherein R, R$^2$, A, A', n, and p$^1$ are as hereinbefore defined, and in Formula XXIV, A' can also contain one or more heteroatoms selected from N, O, S and the like and may be saturated or unsaturated.

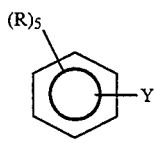

Formula XX.

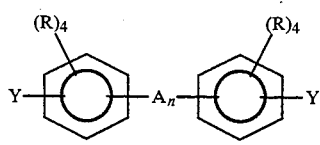

Formula XXI.

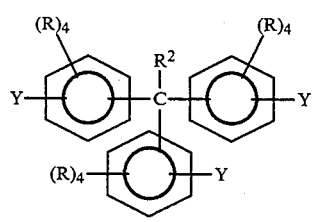

Formula XXII.

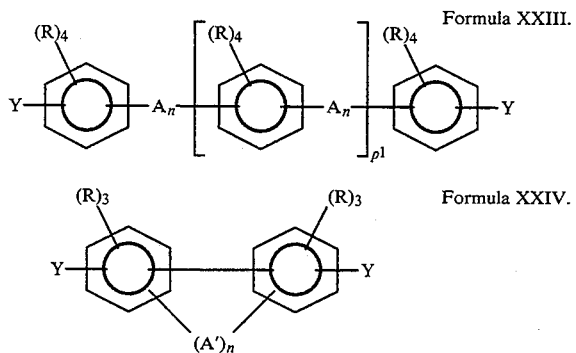

Formula XXIII.

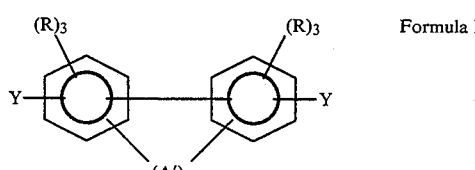

Formula XXIV.

Representative of the nitro and nitroso phenols which are free of mesogenic moieties include, for example, o-, m-, p-nitrophenol, o-, m-, p-nitrosophenol, 3-methyl-4-nitrophenol, 3,5-dimethyl-4-nitrophenol, 3-chloro-4-nitrophenol, 4-nitro-4'-hydroxydiphenyl methane, 4-nitro-4'-hydroxydiphenyl oxide, 4-nitro-4'-hydroxydiphenyl sulfone, (4-nitrophenyl)(4-hydroxyphenyl)-methanone, mixtures thereof and the like.

Representative of the nitro and nitroso phenols containing one or more mesogenic moieties include, for example, 4-hydroxy-4'-nitrodiphenyl, 4-hydroxy-4'-nitrosodiphenyl, 4-hydroxy-4'-nitrostilbene, 4-hydroxy-4'-nitrodiphenylazomethine, 4-hydroxy-4'-nitroazoxybenzene, 4-hydroxy-4'-nitrochalcone, 4-hydroxy-4'-nitrodiphenylacetylene, 4-hydroxy-4'-nitrobenzanilide, 4-nitro-4'-hydroxybenzanilide, 4-hydroxyphenyl-4'-nitrobenzoate, 4-hydroxy-4'-nitro-alpha-cyanostilbene, 4-hydroxy-4'-nitro-alpha-chlorostilbene, 4-hydroxy-4'-nitro-alpha-methylstilbene, 3,3'-dimethyl-4-hydroxy-4'-nitrodiphenyl, mixtures thereof and the like.

Representative of the nitro and nitroso carboxylic acids which are free of mesogenic moieties include, for example, o-, m-, p-nitrobenzoic acid, o-, m-, p-nitrosobenzoic acid, 3-methyl-4-nitrobenzoic acid, 3,5-dimethyl-4-nitrobenzoic acid, 3-chloro-4-nitro-benzoic acid, 4-nitro-4'-carboxydiphenyl methane 4-nitro-4'-carboxydiphenyl oxide, 4-nitro-4'-carboxydiphenyl sulfone, (4-nitrophenyl)(4-carboxyphenyl)methanone, mixtures thereof and the like.

Representative of the nitro and nitroso carboxylic acids containing one or more mesogenic moieties include, for example, 4-carboxy-4'-nitrobiphenyl, 4-carboxy-4'-nitrosodiphenyl, 4-carboxy-4'-nitrostilbene, 4-carboxy-4'-nitrodiphenylazomethine, 4-carboxy-4'-nitroazoxybenzene, 4-carboxy-4'-nitro-chalcone, 4-carboxy-4'-nitrodiphenylacetylene, 4-carboxy-4'-nitrobenzanilide, 4-nitro-4'-carboxybenzanilide, 4-carboxyphenyl-4'-nitrobenzoate, 4-carboxy-4'-nitro-alpha-cyanostilbene, 4-carboxy-4'-nitro-alpha-chlorostilbene, 4-carboxy-4'-nitro-alpha-methylstilbene, 3,3'-dimethyl-4-carboxy-4'-nitrodiphenyl, mixtures thereof and the like.

Representative of the nitro and nitroso mercaptans which are free of mesogenic moieties include, for example, o-, m-, p-nitrobenzenethiol, o-, m-, p-nitrosobenzenethiol, 3-methyl-4-nitrobenzenethiol, 3,5-dimethyl-4-nitrobenzenethiol, 3-chloro-4-nitrobenzenethiol, 4-nitro-4'-mercaptodiphenyl methane, 4-nitro-4'-mercaptodiphenyl oxide, 4-nitro-4'-mercaptodiphenyl sulfone, (4-nitrophenyl)(4-mercaptophenyl)methanone, mixtures thereof and the like.

Representative of the nitro and nitroso mercaptans containing one or more mesogenic moieties include, for example, 4-mercapto-4'-nitrodiphenyl, 4-mercapto-4'-nitrosodiphenyl, 4-mercapto-4'-nitrostilbene, 4-mercapto-4'-nitrodiphenylazomethine, 4-mercapto-4'-nitroazoxybenzene, 4-mercapto-4'-nitrochalcone, 4-mercapto-4'-nitrodiphenylacetylene, 4-mercapto-4'-nitrobenzanilide, 4-nitro-4'-mercaptobenzanilide, 4-mercaptophenyl-4'-nitrobenzoate, 4-mercapto-4'-nitro-alpha-cyanostilbene, 4-mercapto-4'-nitro-alpha-chlorostilbene, 4-mercapto-4'-nitro-alpha-methylstilbene, 3,3'-dimethyl-4-mercapto-4'-nitrodiphenyl, mixtures thereof and the like.

Representative of the nitro and nitroso secondary monoamines which are free of mesogenic moieties include, for example, o-, m-, p-nitro-N-methylaniline, o-, m-, p-nitro-N-ethylaniline, o-, m-, p-nitroso-N-methylaniline, 3-methyl-4-nitro-N-methylaniline, 3,5dimethyl-4-nitro-N-methylaniline, 3-chloro-4-nitro-N-methylaniline, 4-nitro-4'-N-methylaminodiphenyl methane, 4-nitro-4'-N-methylaminodiphenyl oxide, 4-nitro-4'-N-methylaminodiphenyl sulfone, (4-nitrophenyl)(4-N-methylaminophenyl)methanone, mixtures thereof and the like.

Representative of the nitro and nitroso secondary monoamines containing one or more mesogenic moieties include, for example, 4-N-methylamino-4'-nitrodiphenyl, 4-N-ethylamino-4'-nitrodiphenyl, 4-N-methylamino-4'-nitrosodiphenyl, 4-N-methylamino-4'-nitrostilbene, 4-N-methylamino-4'-nitrodiphenylazomethine, 4-N-methylamino-4'-nitroazoxybenzene, 4-N-methylamino-4'-nitrochalcone, 4-N-methylamino-4'-nitrodiphenylacetylene, 4-N-methylamino-4'-nitrobenzanilide, 4-nitro-4'-N-methylaminobenzanilide, 4-N-methylaminophenyl-4'-nitrobenzoate, 4-N-methylamino-4'-nitro-alpha-cyanostilbene, 4-N- methylamino-4'-nitro-alpha-chlorostilbene, 4-N-methylamino-4'-nitro-alpha-methylstilbene, 3,3'-dimethyl-4-N-methylamino-4'-nitrodiphenyl, mixtures thereof and the like.

Nitro(Nitroso) Group Terminated Adducts

The adducts containing terminating nitro(nitroso) groups and one or more mesogenic moieties of the present invention are prepared by reacting (B) one or more materials containing one hydrogen which is reactive with an epoxide group selected from the group consisting of (1) nitro and nitroso phenols, (2) nitro and nitrosocarboxylic acids, (3) nitro and nitrosomercaptans, (4) nitro and nitroso secondary monoamines (5) mixtures thereof with one or more (A) epoxy resins in an amount sufficient to provide from about 1:1 to about 100:1, preferably from about 1:1 to about 20:1, most preferably from about 1:1 to 2:1 equivalents of hydrogen reactive with an epoxide group (excluding secondary hydroxyl groups formed by epoxide ring opening reaction to form the adduct) per equivalent of epoxide reacted, with the proviso that one or more mesogenic moieties are present in either (A) the epoxy resin reactant or (B) the material containing one hydrogen which is reactive with an epoxide group or in both (A) and (B).

The term "reactive with an epoxide group", as employed in the preparation of the adduct means reactive at the conditions employed to prepare the adduct. There may be present hydrogen atoms which are nonreactive with the epoxide group at the conditions employed to prepare the adduct, but which are reactive at conditions at which an epoxy resin is cured with the resultant adduct. In which case, the hydrogen atoms which are not reactive with the epoxy resin at the conditions at which the adduct is prepared are not considered in the aforementioned reactive hydrogen to epoxide ratios.

The term "epoxy resin adduct" as used herein includes the epoxy resin wherein the terminal epoxide groups have been reacted in a ring opening reaction with the material containing one hydrogen which is reactive with an epoxide group to give the characteristic 2-hydroxypropyl functionality as a linkage between the residual epoxy resin structure and the residual structure from the material containing one hydrogen which is reactive with an epoxide group. A typical example is the reaction product of p-nitrophenol and the diglycidyl ether of 4,4'-dihydroxy-alpha-methylstilbene:

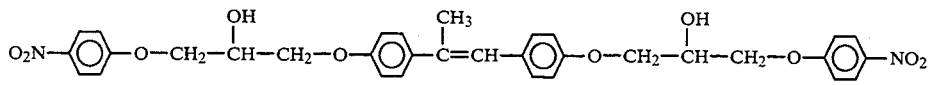

The adduct may also contain unreacted material containing one hydrogen which is reactive with an epoxide group. Thus in the case of the reaction between p-nitrophenol and the diglycidyl ether of 4,4'-dihydroxy-alpha-methylstilbene, if stoichiometric excess of p-nitrophenol is employed and not removed, it thus becomes a part of the epoxy resin adduct. The adduct may also contain branched or crosslinked structure derived from reaction between an epoxide group and the hydroxyl group of a 2-hydroxypropyl linkage contained in said adduct. A typical example is the reaction of a backbone hydroxyl group of the epoxy resin adduct of p-nitrophenol and the diglycidyl ether of 4,4'-dihydroxy-alpha-methylstilbene with an epoxide group from a second molecule of the diglycidyl ether of 4,4'-dihydroxy-alpha-methylstilbene which has already been adducted with p-nitrophenol at one epoxide group of the molecule:

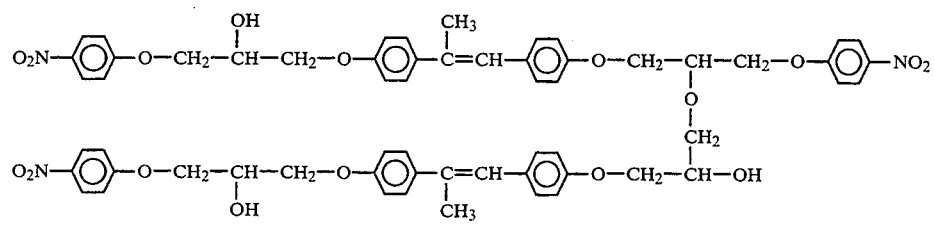

Minor amounts of other structures may be present in the adducts of the present invention, for example, those which may be present in the epoxy resin reactant, such as, the 1,2-glycol group derived from hydrolysis of the epoxide group, or halomethyl groups caused by addition of epihalohydrin to the hydroxyl group of an intermediate halohydrin molecule.

A catalyst is optionally employed to prepare the nitro (nitroso) group terminated adducts containing one or more mesogenic moieties of the present invention. Suitable catalysts include the aforementioned phosphines, quaternary ammonium compounds, phosphonium compounds, tertiary amines, mixtures thereof and the like. The amount of catalyst used, if any, depends upon the particular reactants and catalyst employed; however, it is usually employed in quantities from about 0.01 to about 3, preferably from about 0.01 to about 1.5, most preferably from about 0.03 to about 0.75 percent by weight based upon the weight of the epoxy containing compound.

Reaction conditions for forming the nitro (nitroso) group terminated adducts containing one or more mesogenic moieties of the present invention vary widely depending upon the type and amount of reactants employed, the type and amount of catalyst used, if any, the use of solvent(s), the mode of addition of the reactants employed, and other known variables. Thus, the reaction may be conducted at atmospheric, superatmospheric or subatmospheric pressures at temperatures of from about 0° C. to about 260° C., preferably from about 20° C. to about 200° C., most preferably from about 35° C. to about 160° C. The time required to complete the reaction depends not only upon the aforementioned variables, but also upon the temperature employed. Higher temperatures require shorter periods of time whereas lower temperatures require longer periods of time. Generally, however, times of from about 5 minutes to about one week, more preferably from about 30 minutes to about 72 hours, most preferably from about 60 minutes to about 48 hours are suitable.

The reaction to form the nitro (nitroso) group terminated adducts containing one or more mesogenic moieties of the present invention may be conducted in the presence of one or more solvents. Solvents may be beneficially employed, for example, to improve the solubility of one or more reactants in the reactant mixture, to dissolve a solid reactant thus rendering it easier to meter into the reaction, or to dilute the concentration of reacting species as a means to moderate the adduct forming reaction and thus vary the distribution of components comprising the adduct. Suitable solvents include those which are substantially inert to reaction with any of the reactants employed or the adduct product formed therefrom. Thus the solvents and amounts of said solvents previously described for the advancement reaction are generally suitable for use in the adduct forming reaction.

The contacting together of (A) one or more epoxy resins and (B) one or more materials containing one hydrogen which is reactive with an epoxide group selected from the group consisting of (1) nitro and nitrosophenols, (2) nitro and nitrosocarboxylic acids, (3) nitro and nitrosomercaptans, (4) nitro and nitroso secondary monoamines, (5) mixtures thereof with the proviso that one or more mesogenic moieties may be present in (A) the epoxy resin reactant or (B) the material containing one hydrogen which is reactive with an epoxide group or in both (A) and (B) may be done in any configuration which provides an adduct that is essentially free of epoxide groups. Thus, the epoxy resin component and the material containing one hydrogen which is reactive with an epoxide group may be directly mixed together and subjected to the aforesaid conditions conducive to reaction, or one component may be added to the other component in increments including up to continuous addition. If increments are added, all or a part of an added increment may be allowed to react prior to addition of the next increment.

Various post treatments may be applied to the nitro (nitroso) group terminated adducts containing one or more mesogenic moieties of the present invention as a means to vary the distribution of components comprising the adduct, to modify the reactivity of the adduct with an epoxy resin, to modify the physical state of the adduct, or for other known reasons. As a specific example, in the preparation of the adduct of p-nitrophenol and the diglycidyl ether of 4,4'-dihydroxy-alpha-methylstilbene, a large stoichiometric excess of phenolic hydroxyl groups derived from the p-nitrophenol, with respect to epoxide groups derived from the diglycidyl ether of 4,4'-dihydroxy-alpha-methylstilbene may be used, however, the finished reaction product now contains, as a part of the adduct composition, a high concentration of p-nitrophenol as the unreacted material containing one hydrogen which is reactive with an epoxide group and one or more nitro (nitroso) groups. In the method of the present invention, post treatment of the adduct via vacuum distillation to strip out the unreacted p-nitrophenol may be employed. Many other alternate methods of post treatment to vary the distribution of the components comprising the adducts of the present invention may be employed, such as, for example, recrystallization, sublimation, chromatographic separation, zone refining, crystal refining, wiped film distillation, extraction, preferential chemical derivatization of one or more components of said adduct followed by its removal, combinations thereof and the like. Another class of post treatments of the adducts of the present invention involves the addition of one or more components to the epoxy resin adduct to modify one or more properties of said adduct. For example, one or more accelerators or retarding agents may be blended with the adduct, wherein the nitro groups therein have been reduced to primary amine groups, to modify its subsequent reactivity in curing of an epoxy resin. As a second example, one or more epoxy resin curing agents, such as, for example, those delineated herein may be added to the finished adduct wherein the nitro groups therein have been reduced.

Amine Group Terminated Adducts

The nitro (nitroso) group terminated adducts of the present invention may be reduced to amine terminated adducts. Suitable methods for the reduction of nitro and nitroso compounds to amines are disclosed by March in *Advanced Organic Chemistry*, John Wiley and Sons, pages 1103 to 1106 (1985) which is incorporated herein by reference. The general methods for the reduction reaction include the use of iron, zinc or tin plus a mineral acid, catalytic hydrogenation, for example in the presence of platinum, $AlH_3$—$AlCl_3$, hydrazine plus catalyst, dodecacarbonyltriiron-methanol, $TiCl_3$, hot liquid paraffin, formic acid and palladium on carbon, sulfides such as NaHS, and sodium dihydro(trithio)borate. For the reduction of nitro (nitroso) group terminated adducts possessing functional groups or linkages that are sensitive to reduction under the reaction conditions employed in certain of the reduction chemistries, alternate techniques of preparation may be employed. As a typical example, U.S. Pat. Nos. 3,845,018 and 3,975,444 teach the reduction of aromatic nitro compounds containing the acetylene group, a group sensitive to reduction. The techniques reported therein employ aqueous ferrous sulfate heptahydrate and ammonium hydroxide, aqueous sodium hydrosulfite and potassium carbonate solution, or powdered zinc in ammonium hydroxide. As a second example, Ram and Ehrenkaufer, *Tetrahedron Letters*, volume 25, number 32, pages 3415 to 3418 (1984) teach the reduction of aromatic nitro compounds containing the cyano group, a group sensitive to reduction. The technique reported therein employs palladium on carbon with anhydrous ammonium formate. The aforementioned references are incorporated herein in their entirety.

Functionalized Adducts

The nitro (nitroso) group terminated adducts of the present invention may be partially or totally functionalized via reaction of a part or all of the backbone aliphatic hydroxyl groups contained therein. Suitable methods for the partial or total functionalization of said backbone aliphatic hydroxyl groups include, for example, etherification, esterification, halogenation, urethanation, oxidation/reduction methods, and the like. Thus, reaction of the hydroxyl groups with a dialkyl sulfate or a alkyl halide, such as, for example, dimethyl sulfate or methyl iodide, provides the etherified nitro (nitroso) group terminated adduct. As a typical example, Furniss, Hannaford, Rogers, Smith and Tatchell, *Vogel's Handbook of Practical Organic Chemistry*, Longman, Inc., page 472 (1978) teach etherification of the aliphatic hydroxyl group via reaction with dimethyl sulfate and aqueous sodium hydroxide. Reaction of the hydroxyl groups with an acid anhydride or an acyl halide, such as, for example, acetic anhydride or acetyl chloride, provides the esterified nitro (nitroso) group terminated adduct. As a typical example, the aforementioned Furniss, et al. reference, pages 511 to 512 teaches etherification of the aliphatic hydroxyl group via reaction with acetyl chloride in the presence of dimethylaniline or reaction with acetic anhydride in the presence of anhydrous zinc chloride catalyst. In a reaction similar to esterification of the aliphatic hydroxyl group with an acyl halide, a chloroformate may be used to form the carbonate. Displacement reaction of the hydroxyl groups with a halogen halide or thionyl halide, such as, for example, hydrogen bromide or thionyl chloride, provides the halogenated nitro (nitroso) group terminated adduct. As a typical example, the aformentioned Furniss, et al. reference, pages 381 to 389 teaches halogenation of the aliphatic hydroxyl group via reaction with hydrogen chloride (bromide) or thionyl chloride. Reaction of the hydroxyl groups with a monoisocyanate, such as, for example, methyl or phenyl isocyanate, provides the urethane functionalized nitro (nitroso) group terminated adduct. Reaction of aliphatic hydroxyl groups with isocyanates to form the urethane structure is taught by Oertel, *Polyurethane Handbook*, Hanser Publishers, page 11 (1985) and typically involves the simple contacting together of the compounds containing the hydroxyl and isocyanate groups, optionally in the presence of a catalyst, such as, for example, stannous octoate. Oxidation of the hydroxyl groups, for example by sodium dichromate in dilute sulfuric acid or by an aluminum alkoxide in excess acetone, provides the ketone functionalized nitro group terminated adduct. As a typical example, the aformentioned Furniss, et al. reference, pages 425 to 429 teaches oxidation of secondary aliphatic hydroxyl groups with aqueous chromic acid in a two phase diethylether-water system or aluminum t-butoxide and acetone. Reduction of the ketone groups, for example using the Huang-Minlon modification of the Wolff-Kishner reaction, provides the alkane functionalized nitro group terminated adduct. As a typical example, the aforementioned Furniss, et al. reference, pages 600 to 601, 605 to 606 teaches reduction of ketone groups using hydrazine hydrate and potassium hydroxide.

Thermosettable (Curable) Mixtures

The thermosettable mixtures of the present invention are prepared by mixing together one or more of the amine terminated adducts containing one or more mesogenic moieties with one or more epoxy resins, all, none, or a part of which may contain one or more mesogenic or rodlike moieties. The amine terminated adducts are employed in amounts which will effectively cure the mixture, with the understanding that these amounts will depend upon the particular adduct and epoxy resin employed. Generally, suitable amounts of the adduct include amounts which will provide from about 0.80:1 to about 1.50:1 equivalents of amine hydrogen which is reactive with an epoxide group per equivalent of epoxide group in the epoxy resin at the conditions employed for curing.

The application of heat or a combination of heat and pressure may be employed in the curing of the thermosettable mixtures of the present invention. Temperatures employed can vary over a considerable range but are usually in the range of 20° C. to 250° C. Depending upon the relative solubility and phase transition temperature(s) associated with the mesogenic moieties present in the thermosettable compositions, curing at an elevated temperature can be especially desirable to enhance the molecular anisotropy of the cured product.

The thermosettable mixtures of the present invention may also contain one or more of the known curing agents for epoxy resins such as, for example, primary and secondary polyamines, carboxylic acids and anhydrides thereof, aromatic hydroxyl containing compounds, imidazoles, guanidines, urea-aldehyde resins, alkoxylated urea-aldehyde resins, melamine-aldehyde resins, alkoxylated melamine-aldehyde resins, aliphatic amines, cycloaliphatic amines, aromatic amines, epoxy resin adducts free of mesogenic or rodlike moieties, combinations thereof and the like. Particularly suitable curing agents include, for example, methylenedianiline, 4,4'-diaminostilbene, 4,4'-diaminobenzanilide, 4,4'-diamino-alpha-methylstilbene, dicyandiamide, ethylenediamine, diethylenetriamine, triethylenetetramine, tetraethylenepentamine, urea-formaldehyde resins, melamine-formaldehyde resins, methylolated urea-formaldehyde resins, methylolated melamine-formaldehyde resins, phenol-formaldehyde novolac resins, sulfanilamide, diaminodiphenylsulfone, diethyltoluenediamine, t-butyltoluenediamine, bis-4-aminocyclohexylmethane, isophoronediamine, diaminocyclohexane, hexamethylenediamine, piperazine, aminoethylpiperazine, 2,5-dimethyl-2,5-hexanediamine, 1,12-dodecanediamine, tris-3-aminopropylamine, combinations thereof and the like. If used as a component of the thermosettable mixtures of the present invention, from about 1 to about 99, preferably from about 1 to about 40, most preferably from about 1 to about 20 percent of the equivalents of hydrogen which are reactive with an epoxide group provided by the adduct containing one or more mesogenic moieties are substituted out by using one or more of the aforesaid curing agents.

Orientation

During processing prior to curing and/or during cure of the curable epoxy resin compositions into a part, electric or magnetic fields or shear stresses can be applied for the purpose of orienting the mesogenic or rodlike moieties contained or developed therein which in effect improves the mechanical properties. As specific examples of these methods, Finkelmann, et al, *Macromol. Chem.*, 180, 803–806 (March 1979) induced orientation in thermotropic methacrylate copolymers containing mesogenic side chain groups decoupled from the main chain via flexible spacers in an electric field. Orientation of mesogenic side chain groups decoupled from the polymer main chain via flexible spacers in a magnetic field has been demonstrated by Roth and Kruecke, *Macromol. Chem.*, 187, 2655–2662 (November 1986). Magnetic field induced orientation of mesogenic main chain containing polymers has been demonstrated by Moore, et al, *ACS Polymeric Material Sciences and Engineering*, 52, 84–86 (April–May 1985). Magnetic and electric field orientation of low molecular weight mesogenic compounds is discussed by W. R. Krigbaum in *Polymer Liquid Crystals*, pages 275–309 (1982) published by Academic Press, Inc. All of the above are incorporated herein by reference in their entirety.

In addition to orientation by electric or magnetic fields, polymeric mesophases can be oriented by drawing and/or shear forces which are induced by flow through dies, orifices, and mold gates. A general discussion for orientation of thermotropic liquid crystal polymers by this method is given by S. K. Garg and S. Kenig in *High Modulus Polymers*, pages 71–103 (1988) published by Marcel Dekker, Inc. which is incorporated herein by reference. For the mesomorphic systems based on the epoxy resin compositions, this shear orientation can be produced by processing methods such as injection molding, extrusion, pultrusion, filament winding, filming and prepreging.

The thermosettable mixtures of the present invention can be blended with other materials such as solvents or diluents, fillers, pigments, dyes, flow modifiers, thickeners, reinforcing agents, mold release agents, wetting agents, stabilizers, fire retardant agents, surfactants, combinations thereof and the like.

These additives are added in functionally equivalent amounts, e.g., the pigments and/or dyes are added in quantities which will provide the composition with the desired color; however, they are suitably employed in amounts of from about zero to about 20, more suitably from about 0.5 to about 5, most suitably from about 0.5 to about 3 percent by weight based upon the weight of the total blended composition.

Solvents or diluents which can be employed herein include, for example, hydrocarbons, ketones, glycol ethers, aliphatic ethers, cyclic ethers, esters, amides, monoepoxides, combinations thereof and the like. Particularly suitable solvents or diluents include, for example, toluene, benzene, xylene, methyl ethyl ketone, methyl isobutyl ketone, diethylene glycol methyl ether, dipropylene glycol methyl ether, dimethylformamide, N-methylpyrrolidinone, tetrahydrofuran, propylene glycol methyl ether, 4-tertiary-butylphenyl glycidyl ether, cresyl glycidyl ether, epoxidized soybean oil, combinations thereof and the like.

The modifiers such as thickeners, flow modifiers and the like can be suitably employed in amounts of from zero to about 10, more suitably from about 0.5 to about 6, most suitably from about 0.5 to about 4 percent by weight based upon the weight of the total composition.

Reinforcing materials which can be employed herein include natural and synthetic fibers in the form of woven fabric, mats, monofilament, multifilament, unidirectional fibers, rovings, random fibers or filaments, inorganic fillers of whiskers, hollow spheres, and the like. Suitable reinforcing materials include, glass, ceramics, nylon, rayon, cotton, aramid, graphite, polyalkylene terephthalates, polyethylene, polypropylene, polyesters, combinations thereof and the like.

Suitable fillers which can be employed herein include, for example, inorganic oxides, ceramic microspheres, plastic microspheres, glass microspheres, inorganic whiskers, $CaCO_3$, combinations thereof and the like.

The fillers can be employed in amounts suitable from about zero to about 95, more suitably from about 10 to about 80, most suitably from about 40 to about 60 percent by weight based upon the weight of the total composition.

The compositions of the present invention are useful in, but not limited to, applications such as coatings, encapsulations, extrusions, moldings, films, pultrusions, electrical and structural laminates or composites, and the like. In some instances, they can be formed into monofilament and multifilament fibers.

The following examples are illustrative of the present invention, but are not to be construed as to limiting its scope in any manner.

EXAMPLE 1

A. Synthesis of p-Nitrophenol Adduct of 4,4'-Diglycidyloxy-α-methylstilbene 4,4'-Diglycidyloxy-α-methylstilbene (88.68 grams, 0.5 epoxide equivalent) and p-nitrophenol (139.1 grams, 1.0 mole) are added to a reactor equipped with a chilled glycol condenser and stirred as a powder under a nitrogen atmosphere. The 4,4'-diglycidyloxy-α-methylstilbene used has an epoxide equivalent weight (EEW) of 177.36 and exhibits monotropic liquid crystallinity with a 133° C. isotropization temperature, 94° C. onset to nematic liquid crystallinity and a 61° C. onset to crystallization. Heating commences and after eleven minutes, 90° C. is achieved. At this temperature, ethyltriphenylphosphonium acetate.acetic acid complex catalyst (70% solids in methanol) (0.2278 grams, 0.10% weight of the total reactants) is added to the stirred powder. Heating continues for five more minutes until 125° C. is achieved and a solution forms. After an additional two minutes of heating, the temperature reaches 150° C., and heating ceases. After one minute, exothermic heating to a peak temperature of 171° C. occurs. After an additional nine minutes, the 150° C. temperature is reachieved and is held for the next hour. After this time, the temperature is increased to 175° C. over a nine minute period and is held therein for the next 291 minutes. After this time, the reactor is put under a 1 mm Hg vacuum while maintaining the 175° C. temperature. After two hours, the vacuum stripped product is recovered as a tacky black solid at 25° C. Epoxide titration of a portion of the product reveals the presence of no residual epoxide. Fourier transform infrared spectrophotometric analysis of a potassium bromide pellet of the product reveals the presence of the expected asymmetric nitro group stretching at 1503 $cm^{-1}$ and the symmetric nitro group stretching at 1337 $cm^{-1}$ and the hydroxyl group O—H stretching centered at 3369 $cm^{-1}$ (broad).

B. Hydrogenation of p-Nitrophenol Adduct of 4,4'-Diglycidyloxy-α-methylstilbene A portion (14.56 grams, 0.046 nitro equivalent) of p-nitrophenol adduct of 4,4'-diglycidyloxy-α-methylstilbene from A above is dissolved in 1,4-dioxane (100 grams) and added to a dropping funnel. Sodium hydrosulfite (85% technical) (47.11 grams, 0.23 mole active), anhydrous potassium carbonate (31.78 grams, 0.23 mole) and deionized water (250 grams) are added to a reactor and stirred to provide a solution. After cooling to 25° C., the 1,4-dioxane solution of the nitro adduct is added dropwise to the reactor over a 144 minute period and so as to maintain the 25° C. temperature. The reaction product is maintained for an additional thirty minutes at 25° C. then stirring is shut off to allow separation of the aqueous and organic layers to occur. The bottom aqueous layer is pipetted off and discarded, while the top organic layer is rotary evaporated to a dry powder using final conditions of 50° C. and 1 mm Hg. Deionized water (500 milliliters) is added to the dry powder product followed by heating to 70° C. to provide a solution. While still hot, the solution is filtered through Celite then rotary evaporated to a total volume of 50 milliliters. After cooling to 25° C., ethanol (200 milliliters) is added to the product with shaking. The resulting slurry is filtered and the product recovered on the filter is dried in a vacuum oven at 80° C. and 1 mm Hg to a constant weight of 12.12 grams of light tan colored powder. Fourier transform infrared spectrophotometric analysis of a potassium bromide pellet of the product reveals the presence of the expected primary amine group N—H stretching at 3343 and 3283 cm$^{-1}$ and hydroxyl group O—H stretching at 3442 cm$^{-1}$, concurrent with complete disappearance of the asymmetric and symmetric nitro group stretching. Titration of a portion of the product demonstrates the presence of 3.475 milequivalents of —NH$_2$ per gram of product. This equates to a 287.94 —NH$_2$ equivalent weight, versus a 286.48 theoretical —NH$_2$ equivalent weight.

EXAMPLE 2

A. Synthesis of m-Nitrophenol Adduct of 4,4'-Diglycidyloxy-α-methylstilbene 4,4'-Diglycidyloxy-α-methylstilbene (88.68 grams, 0.5 epoxide equivalent) and m-nitrophenol (139.1 grams, 1.0 mole) are added to a reactor equipped with a chilled glycol condenser and stirred as a powder under a nitrogen atmosphere. The 4,4'-diglycidyloxy-α-methylstilbene used has an epoxide equivalent weight (EEW) of 177.36 and exhibits monotropic liquid crystallinity with a 133° C. isotropization temperature, 94° C. onset to nematic liquid crystallinity and a 61° C. onset to crystallization. Heating commences and after eleven minutes, 90° C. is achieved. At this temperature, ethyltriphenylphosphonium acetate.acetic acid complex catalyst (70% solids in methanol) (0.2278 grams, 0.10% weight of the total reactants) is added to the stirred powder. Heating continues for seven more minutes until 150° C. is achieved then heating ceases. After two minutes, exothermic heating to a peak temperature of 172° C. occurs. After an additional six minutes, the 150° C. temperature is reachieved and is held for the next fifty two minutes. After this time, the temperature is increased to 175° C. over a twelve minute period and is held therein for the next 5 hours. After this time, the reactor is put under a 1 mm Hg vacuum while maintaining the 175° C. temperature. After two hours, the vacuum stripped product is recovered as a tacky black solid at 25° C. Epoxide titration of a portion of the product reveals the presence of no residual epoxide. Fourier transform infrared spectrophotometric analysis of a potassium bromide pellet of the product reveals the presence of the expected asymmetric nitro group stretching at 1530 cm$^{-1}$ and the symmetric nitro group stretching at 1350 cm$^{-1}$ and the hydroxyl group O—H stretching centered at 3376 cm$^{-1}$ (broad).

B. Hydrogenation of m-Nitrophenol Adduct of 4,4'-Diglycidyloxy-α-methylstilbene A portion (14.56 grams, 0.046 nitro equivalent) of m-nitrophenol adduct of 4,4'-diglycidyloxy-α-methylstilbene from A above is dissolved in 1,4-dioxane (50 grams) and added to a dropping funnel. Sodium hydrosulfite (85% technical) (47.11 grams, 0.23 mole active), anhydrous potassium carbonate (31.78 grams, 0.23 mole) and deionized water (250 grams) are added to a reactor and stirred to provide a solution. After cooling to 32° C., the 1,4-dioxane solution of the nitro adduct is added dropwise to the reactor over a one hour period and so as to maintain the reaction temperature between 32° and 36° C. The reaction product is maintained for an additional two hours while allowing the temperature to cool to 25° C. then stirring is shut off to allow separation of the aqueous and organic layers to occur. The bottom aqueous layer is pipetted off and discarded, while the top organic layer is rotary evaporated to a dry powder using final conditions of 50° C. and 1 mm Hg. Deionized water (500 milliliters) is added to the dry powder product followed by heating to 70° C. to provide a solution. While still hot, the solution is filtered through Celite then rotary evaporated to a total volume of 50 milliliters. After cooling to 25° C., ethanol (200 milliliters) is added to the product with shaking. The resulting slurry is filtered and the product recovered on the filter is dried in a vacuum oven at 80° C. and 1 mm Hg to a constant weight of 9.1 grams of light tan colored powder. Fourier transform infrared spectrophotometric analysis of a potassium bromide pellet of the product reveals the presence of the expected primary amine group N—H stretching and hydroxyl group O—H stretching at 3442 and 3283 (shoulder) cm$^{-1}$ concurrent with complete disappearance of the asymmetric and symmetric nitro group stretching. Titration of a portion of the product demonstrates the presence of 3.408 milequivalents of —NH$_2$ per gram of product. This equates to a 293.46 —NH$_2$ equivalent weight, versus a 286.48 theoretical —NH$_2$ equivalent weight.

EXAMPLE 3

A. Synthesis of 3-Methyl-4-Nitrophenol Adduct of 4,4'-Diglycidyloxy-α-methylstilbene 4,4'-Diglycidyloxy-α-methylstilbene (88.68 grams, 0.5 epoxide equivalent) and 3-methyl-4-nitrophenol (153.1 grams, 1.0 mole) are added to a reactor equipped with a chilled glycol condenser and stirred as a powder under a nitrogen atmosphere. The 4,4'-diglycidyloxy-α-methylstilbene used has an epoxide equivalent weight (EEW) of 177.36 and exhibits monotropic liquid crystallinity with a 133° C. isotropization temperature, 94° C. onset to nematic liquid crystallinity and a 61° C. onset to crystallization. Heating commences and after twelve minutes, 90° C. is achieved. At this temperature, ethyltriphenylphosphonium acetate.acetic acid complex catalyst (70% solids in methanol) (0.2418 grams, 0.10% weight of the total reactants) is added to the stirred powder. Heating continues for nine more minutes until 150° C. is achieved and heating of the solution ceases. After five minutes, exothermic heating to a peak temperature of 161° C. occurs. After an additional two minutes, the temperature has decreased to 160° C. At this time, the temperature is increased to 175° C. over a six minute period and is held therein for the next 287 minutes. After this time, the reactor is put under a 1 mm Hg vacuum while maintaining the 175° C. temperature. After two hours, the vacuum stripped product is recovered as a black solid at 25° C. Epoxide titration of a portion of the product reveals the presence of no residual epoxide. Fourier transform infrared spectrophotometric analysis of a potassium bromide pellet of the product reveals the presence of the expected asymmetric nitro group stretching at 1510 cm$^{-1}$ (overlaps with aromatic ring absorption) and the symmetric nitro group stretching at 1337 cm$^{-1}$ and the hydroxyl group O—H stretching centered at 3436 cm$^{-1}$ (broad).

B. Hydrogenation of 3-Methyl-4-Nitrophenol Adduct of 4,4'-Diglycidyloxy-α-methylstilbene A portion (15.20 grams, 0.046 nitro equivalent) of 3-methyl-4-nitrophenol adduct of 4,4'-diglycidyloxy-α-methylstilbene from A above is dissolved in 1,4-dioxane (50 grams) and added to a dropping funnel. Sodium hydrosulfite (85% technical) (47.11 grams, 0.23 mole active), anhydrous potassium carbonate (31.78 grams, 0.23 mole) and deionized water (250 grams) are added to a reactor and stirred to provide a solution. After cooling to 33° C., the 1,4-dioxane solution of the nitro adduct is added dropwise to the reactor over a 100 minute period and so as to maintain the reaction temperature between 31° and 33° C. The reaction product is maintained for an additional one hour while allowing the temperature to cool to 30° C. then stirring is shut off to allow separation of the aqueous and organic layers to occur. The bottom aqueous layer is pipetted off and discarded, while the top organic layer is rotary evaporated to a dry powder using final conditions of 50° C. and 1 mm Hg. Deionized water (200 milliliters) is added to the dry powder product followed by heating to 70° C. to provide a solution. While still hot, the solution is filtered through Celite then rotary evaporated to a total volume of 50 milliliters. After cooling to 25° C., ethanol (200 milliliters) is added to the product with shaking. The resulting slurry is filtered and the product recovered on the filter is dried in a vacuum oven at 80° C. and 1 mm Hg to a constant weight of 8.10 grams of tan colored powder. Fourier transform infrared spectrophotometric analysis of a potassium bromide pellet of the product reveals the presence of the expected primary amine group N—H stretching and hydroxyl group O—H stretching at 3429 cm$^{-1}$ with a shoulder at 3270 cm$^{-1}$, concurrent with complete disappearance of the asymmetric and symmetric nitro group stretching. Titration of a portion of the product demonstrates the presence of 2.923 milequivalents of —NH$_2$ per gram of product. This equates to a 342.09 —NH$_2$ equivalent weight, versus a 300.51 theoretical —NH$_2$ equivalent weight.

EXAMPLE 4

Copolymerization of p-Aminophenol Adduct of 4,4'-Diglycidyoxy-α-metof methylstilbene with 4,4'-Diglycidyloxy-α-methylstilbene A portion (0.1514 gram, 0.00105>NH equivalent) of the p-aminophenol adduct of 4,4'-diglycidyloxy-α-methylstilbene from Example 1-B and 4,4'-diglycidyloxy-α-methylstilbene (175.147 epoxide equivalent weight) (0.1842 gram, 0.00105 epoxide equivalent) are added to a ceramic mortar and ground together until a homogeneous powder is formed. A portion (11.9 milligrams) of the adduct and epoxy resin blend is analyzed by differential scanning calorimetry using a heating rate of 10° C. per minute under a stream of nitrogen flowing at 35 cubic centimeters per minute and a temperature range from 30° to 300° C. An endotherm is obtained with an onset temperature of 116.2° C., a minimum at 130.4° C., an endpoint temperature of 138° C. and an enthalpy of 35.4 joules per gram. An exotherm is obtained with an onset temperature of 189.5° C., a maximum at 240.7° C., an endpoint temperature of 268.3° C. and an enthalpy of 121.3 joules per gram. A second exotherm is obtained with an onset temperature of 268.3° C., a maximum at 271.1° C., an endpoint temperature of 292° C. and an enthalpy of 26.7 joules per gram. A second scanning reveals a 148.5° C. glass transition temperature and an exothermic rise with an onset temperature of 280° C. Analysis of the brown colored solid product recovered from the differential scanning calorimetry analysis (second scanning) via crosspolarized light microscopy at 70× magnification reveals a high level of birefringence caused by dispersed domains having liquid crystalline textures. Analysis of a portion of the adduct and epoxy resin blend via crosspolarized light microscopy is completed using a microscope equipped with a programmable hot stage using a heating rate of 10° C. per minute and 70× magnification. The following results are obtained:

| Observed Transition Temperatures (°C.) | Comments |
| --- | --- |
| 30 | Birefringent solid. |
| 126 | First melting observed. |
| 133 | Isotropic melt containing dispersed crystals of the adduct. |
| 160 | Partial melting of crystals. |
| 180 | Thermosets, some crystals still present. |
| 230 | Begins to darken. |
| 260 | Birefringent brown solid containing some crystals. |

When cooled to room temperature (24° C.), the product retains its birefringent appearance.

Analysis of a second portion of the adduct and epoxy resin blend via crosspolarized light microscopy is completed using a microscope equipped with a programmable hot stage preheated to 160° C. and 70× magnification. The blend melts at the 160° C. temperature with the presence of some crystals. After two minutes, small birefringent domains having liquid crystal texture are observed with crystals still present. Upon cooling of this fluid to room temperature (25° C.), the resin solidifies with retention of the liquid crystal texture.

Analysis of a third portion of the adduct and epoxy resin blend via crosspolarized light microscopy is completed using a microscope equipped with a programmable hot stage preheated to 140° C. and 70× magnification. The blend partially melts at the 140° C. temperature with the presence of some crystals and liquid crystal texture. Shearing of the resin at this time, between the glass coverslip and glass microscope slide produces orientation of the liquid crystalline domains in the direction perpendicular to that in which the shear is applied.

EXAMPLE 5

Copolymerization of m-Aminophenol Adduct of 4,4'-Diglycidyoxy-α-methylstilbene with 4,4'-Diglycidyloxy-α-methylstilbene A portion (0.2001 gram, 0.00136>NH equivalent) of the m-aminophenol adduct of 4,4'-diglycidyloxy-α-methylstilbene from Example 2-B and 4,4'-diglycidyloxy-α-methylstilbene (175.147 epoxide equivalent weight) (0.2389 gram, 0.00136 epoxide equivalent) are added to a ceramic mortar and ground together until a homogeneous powder is formed. A portion (23.5 milligrams) of the adduct and epoxy resin blend is analyzed by differential scanning calorimetry using a heating rate of 10° C. per minute under a stream of nitrogen flowing at 35 cubic centimeters per minute and a temperature range from 30° to 300° C. An endotherm is obtained with an onset temperature of 116.3° C., a minimum at 128.2° C., an endpoint temperature of 148° C. and an enthalpy of 37.1 joules per gram. An exotherm is obtained with an onset temperature of 200.7° C., a maximum at 219.8° C., and an endpoint temperature of 258.2° C. A second exotherm is obtained with an onset temperature of 258.2° C., a maximum at 284.3° C. and an endpoint temperature above 300° C. A second scanning reveals a 137.4° C. glass transition temperature and an exothermic rise with an onset temperature of 280.7° C. Analysis of the brown colored powdery (unfused) product recovered from the differential scanning calorimetry analysis (second scanning) via crosspolarized light microscopy at 70× magnification reveals a high level of birefringence. Analysis of a portion of the adduct and epoxy resin blend via crosspolarized light microscopy using a microscope equipped with a hot stage using a heating rate of 10° C. per minute and commencing at 30° C. fails to produce meaningful results due to the vaporization of material from the isotropic melt containing crystals once 260° C. is achieved. Analysis of a second portion of the adduct and epoxy resin blend via crosspolarized light microscopy is completed using a microscope equipped with a programmable hot stage preheated to 220° or 240° C. In both cases, the blend immediately solidifies after only partial melting of the adduct crystals occurs.

EXAMPLE 6

Preparation of a Casting of the m-Aminophenol Adduct of 4,4'-Diglycidyloxy-α-methylstilbene with 4,4'-Diglycidyloxy-α-methylstilbene The remaining blend of m-aminophenol adduct of 4,4'-diglycidyloxy-α-methylstilbene with 4,4'-diglycidyloxy-α-methylstilbene from Example 5 is added to an aluminum pan and placed into an oven which has been preheated to 220° C. After one minute at 220° C., the powder has fused together. After an additional four minutes at 220° C., a brown solid is obtained which is peeled from the aluminum surface as a film. After a total of 2 hours at 220° C., the temperature in the oven is increased to 240° C. After two hours at 240° C., the casting is recovered. Analysis of a portion of the brown colored casting via crosspolarized light microscopy at 70× magnification reveals a high level of birefringence. A portion (30.0 milligrams) of the cured casting of the adduct and epoxy resin blend is analyzed by differential scanning calorimetry using a heating rate of 10° C. per minute under a stream of nitrogen flowing at 35 cubic centimeters per minute and a temperature range from 30° to 300° C. No events are observed up to 262.3° C., at which temperature an exothermic rise begins.

EXAMPLE 7

Copolymerization of 3-Methyl-4-Aminophenol Adduct of 4,4'-Diglycidyloxy-α-methylstilbene with 4,4'-Diglycidyloxy-α-methylstilbene A portion (0.2040 gram, 0.00119>NH equivalent) of the 3-methyl-4-aminophenol adduct of 4,4'-diglycidyloxy-α-methylstilbene from Example 3-B and 4,4'-diglycidyloxy-α-methylstilbene (175.147 epoxide equivalent weight) (0.2089 gram, 0.00119 epoxide equivalent) are added to a ceramic mortar and ground together until a homogeneous powder is formed. A portion (12.7 milligrams) of the adduct and epoxy resin blend is analyzed by differential scanning calorimetry using a heating rate of 10° C. per minute under a stream of nitrogen flowing at 35 cubic centimeters per minute and a temperature range from 30° to 300° C. An endotherm is obtained with an onset temperature of 118.9° C., a minimum at 131.8° C., an endpoint temperature of 141° C. and an enthalpy of 40.6 joules per gram. An exotherm is obtained with an onset temperature of 222.6° C., a maximum at 236.4° C., an endpoint temperature of 281.9° C., and an enthalpy of 137.5 joules per gram. A second exotherm is obtained with an onset temperature of 281.9° C., a maximum at 291.3 and an endpoint temperature above 300° C. A second scanning reveals a 140.7° C. glass transition temperature and an exothermic rise with an onset temperature of 272.3° C.

EXAMPLE 8

Preparation of a Casting of the 3-Methyl-4-Aminophenol Adduct of 4,4'-Diglycidyloxy-α-methylstilbene with 4,4'-Diglycidyloxy-α-methylstilbene The remaining blend of 3-methyl-4-aminophenol adduct of 4,4'-diglycidyloxy-α-methylstilbene with 4,4'-diglycidyloxy-α-methylstilbene from Example 7 is added to an aluminum pan and placed into an oven which has been preheated to 210° C. After two minutes at 210° C., softening is observed. After an additional three minutes at 210° C., solidification occurs. After a total of 2 hours at 210° C., the temperature in the oven is increased to 230° C. After two hours at 230° C., the casting is recovered. Analysis of a portion of the brown colored casting via crosspolarized light microscopy at 70× magnification reveals a high level of birefringence. A portion (40.0 milligrams) of the casting of the adduct and epoxy resin blend is analyzed by differential scanning calorimetry using a heating rate of 10° C. per minute under a stream of nitrogen flowing at 35 cubic centimeters per minute and a temperature range from 30° to 300° C. No events are observed up to 249.7° C., at which temperature an exothermic rise begins. A second scanning reveals no events up to 260.4° C., at which temperature an exothermic rise begins.

EXAMPLE 9

A. Synthesis of p-Nitrophenol Adduct of 4,4'-Diglycidyloxy-α-methylstilbene 4,4'-Diglycidyloxy-α-methylstilbene (53.21 grams, 0.30 epoxide equivalent) and p-nitrophenol (42.15 grams, 0,303 mole) are added to a reactor equipped with a chilled glycol condenser and stirred as a powder under a nitrogen atmosphere. The 4,4'-diglycidyloxy-α-methylstilbene used has an epoxide equivalent weight (EEW) of 177.36 and exhibits monotropic liquid crystallinity with a 133° C. isotropization temperature, 94° C. onset to nematic liquid crystallinity and a 61° C. onset to crystallization. Heating commences and after eight minutes, 90° C. is achieved. At this temperature, ethyltriphenylphosphonium acetate.acetic acid complex catalyst (70% solids in methanol) (0.0954 grams, 0.10% weight of the total reactants) is added to the stirred powder. Heating continues for seven more minutes until 125° C. is achieved and a solution forms. After an additional two minutes of heating, the temperature reaches 150° C., heating ceases and air cooling of the reactor exterior is employed. An exotherm to 170° C. occurs two minutes later with cooling to 150° C. after an additional four minutes, at which time air cooling of the reactor ceases. After an additional six hours at the 150° C. temperature, the product is recovered as a brittle black solid at 25° C. Epoxide titration of a portion of the product reveals the presence of no residual epoxide. Fourier transform infrared spectrophotometric analysis of a neat film of the product on a potassium chloride plate reveals the presence of the expected asymmetric nitro group stretching at 1497 cm$^{-1}$ and the symmetric nitro group stretching at 1337 cm$^{-1}$ and the hydroxyl group O—H stretching centered at 3462 cm$^{-1}$ (broad).

B. Methylation of the p-Nitrophenol Adduct of 4,4′-Diglycidyloxy-α-methylstilbene A portion (15.86 grams, 0.05 hydroxyl equivalent) of p-nitrophenol adduct of 4,4′-diglycidyloxy-α-methylstilbene from A above and acetone (100 milliliters) are added to a reactor and stirred under a nitrogen atmosphere to provide a solution. Sodium hydroxide (97%) (12.0 grams, 0.30 mole) dissolved in deionized water (18.0 grams) is added to a dropping funnel. Dimethyl sulfate (18.92 grams, 0.15 mole) is added to a separate dropping funnel. While at room temperature (23° C.), a portion (7.5 milliliters) of the aqueous sodium hydroxide solution is added to the reactor followed by heating to 50° C. Once the 50° C. temperature is achieved, the remaining aqueous sodium hydroxide and dimethyl sulfate are added simultaneously and dropwise to the reactor over a 118 minute period while maintaining the reaction temperature at 50° C. The reaction product is maintained for an additional 45 minutes at 50° C. The product is rotary evaporated to a dry powder using final conditions of 80° C. and 1 mm Hg. Deionized water (250 milliliters) and methylene chloride (250 milliliters) are added to the dry powder product to provide a solution. The methylene chloride layer is separated using a separatory funnel, then washed with two portions (100 milliliters) of deionized water. The methylene chloride layer is dried over anhydrous sodium sulfate then filtered. Rotary evaporation of the methylene chloride is completed using final conditions of 105° C. and 1 mm Hg to provide a constant weight of 16.29 grams of black brittle solid at 25° C. Fourier transform infrared spectrophotometric analysis of a neat film of the product on a potassium chloride plate reveals the complete disappearance of the hydroxyl group O—H stretching, the presence of the expected asymmetric nitro group stretching at 1497 cm$^{-1}$ and the symmetric nitro group stretching at 1344 cm$^{-1}$ and the appearance of methoxy group —C—H stretching at 2837 cm$^{-1}$.

C. Hydrogenation of Methylated p-Nitrophenol Adduct of 4,4′-Diglycidyloxy-α-methylstilbene A portion (16.27 grams, 0.0491 nitro equivalent) of methylated p-nitrophenol adduct of 4,4′-diglycidyloxy-α-methylstilbene from B above is dissolved in 1,4-dioxane (80 grams) and then added to a dropping funnel. Sodium hydrosulfite (85% technical) (50.30 grams, 0.2456 mole active), anhydrous potassium carbonate (33.94 grams, 0.2456 mole), deionized water (250 grams) and 1,4-dioxane (150 grams) are added to a reactor and stirred to provide a solution. After cooling to 32° C., the 1,4-dioxane solution of the nitro adduct is added dropwise to the reactor over a thirty minute period and so as to maintain the reaction temperature between 28° and 32° C. The reaction product is maintained for an additional fifteen hours while allowing the temperature to cool to 25° C. then stirring is shut off to allow separation of the aqueous and organic layers to occur. The bottom aqueous layer is pipetted off and discarded, while the top organic layer is rotary evaporated to a dry powder using final conditions of 120° C. and 1 mm Hg. Methylene chloride (300 milliliters) is added to the dry powder product followed by mixing to provide a slurry. The slurry is filtered through a coarse fritted glass funnel then recovered and added to 60° C. deionized water (300 milliliters) with stirring. Once a stirred solution is obtained, isopropanol (1200 milliliters) is added in 300 milliliter portions to the stirred solution. After stirring the resulting slurry for thirty minutes, filtration through a medium fritted glass funnel is completed and the product recovered on the filter is washed with isopropanol (100 milliliters), then dried in a vacuum oven at 80° C. and 1 mm Hg to a constant weight of 11.02 grams of light tan colored powder. Fourier transform infrared spectrophotometric analysis of a potassium bromide pellet of the product reveals the presence of the expected primary amine group N—H stretching 3442 and 3263 (shoulder) cm$^{-1}$, concurrent with complete disappearance of the asymmetric and symmetric nitro group stretching and the methoxy group —C—H stretching at 2831 cm$^{-1}$. Titration of a portion of the product demonstrates the presence of 3.316 milequivalents of —NH$_2$ per gram of product. This equates to a 301.57 —NH$_2$ equivalent weight, versus a 300.51 theoretical —NH$_2$ equivalent weight.

D. Analysis of the Methylated p-Aminophenol Adduct of 4,4′-Diglycidyloxy-α-methylstilbene for Liquid Crystallinity A portion (23.5 milligrams) of the adduct from C above is analyzed by differential scanning calorimetry using a heating rate of 10° C. per minute under a stream of nitrogen flowing at 35 cubic centimeters per minute and a temperature range from 30° to 300° C. An endotherm is obtained with an onset temperature of 54.8° C., a minimum at 139.8° C., an endpoint temperature of 182.5° C. and an enthalpy of 123.1 joules per gram. Analysis of the brown colored powdery (unfused) product recovered from the differential scanning calorimetry analysis via crosspolarized light microscopy at 70× magnification reveals a high level of birefringence. Analysis of a portion of the methylated adduct via crosspolarized light microscopy is completed using a microscope equipped with a programmable hot stage using a heating rate of 10° C. per minute and 70× magnification. The following results are obtained:

| Observed Transition Temperatures (°C.) | Comments |
| --- | --- |
| 30 | Opaque powder. |
| 125 | First softening observed. |
| 183 | Partial melt, birefringent. |
| 195 | Fuses to birefringent solid. |
| 220 | Semi-solid, birefringent. |
| 234 | Partial melt, birefringent. |
| 245 | Viscous, birefringent melt with liquid crystal texture present. |
| 300 | Same as at 245° C., darkens to reddish brown color. |

When cooled to room temperature (24° C.), the product retains its birefringent appearance.

EXAMPLE 10

Copolymerization of Methylated p-Aminophenol Adduct of 4,4′-Diglycidyoxy-α-methylstilbene with 4,4′-Diglycidyloxy-α-methylstilbene Using 1:1 —NH to Epoxide Stoichiometry A portion (0.2959 gram, 0.00196 >NH equivalent) of the methylated p-aminophenol adduct of 4,4′-diglycidyloxy-α-methylstilbene from Example 9-C and 4,4′-diglycidyloxy-α-methylstilbene (177.355 epoxide equivalent weight) (0.3480 gram, 0.00196 epoxide equivalent) are added to a ceramic mortar and ground together until a homogeneous powder is formed. A portion (16.6 milligrams) of the adduct and epoxy resin blend is analyzed by differential scanning calorimetry using a heating rate of 10° C. per minute under a stream of nitrogen flowing at 35 cubic centimeters per minute and a temperature range from 30° to 300° C. An endotherm is obtained with an onset temperature of 118.4° C., a minimum at 129.7° C., an endpoint temperature of 140° C. and an enthalpy of 33.9 joules per gram. An exotherm is obtained with an onset temperature of 184.4° C., a maximum at 194.7° C., an endpoint temperature of 220.5° C. and an enthalpy of 174.6 joules per gram. A second scanning reveals a 108.4° C. glass transition temperature and an exothermic rise with an onset temperature of 267.7° C. Analysis of the fused, opaque, dark reddish brown colored solid product recovered from the differential scanning calorimetry analysis (second scanning) via crosspolarized light microscopy at 70× magnification revealed a high level of birefringence. Analysis of a portion of the methylated adduct and epoxy resin blend via crosspolarized light microscopy is completed using a microscope equipped with a programmable hot stage using a heating rate of 10° C. per minute and 70× magnification. The following results are obtained:

| Observed Transition Temperatures (°C.) | Comments |
|---|---|
| 30 | Opaque solid. |
| 126 | Partial melting observed. |
| 134 | Viscous melt containing large birefringent regions possessing liquid crystal texture. |
| 150 | Semi-solid containing large birefringent regions. |
| 170 | Application of shear produces birefringent striations in the shear direction. |
| 191 | Birefringent phase is starting to clear. |
| 200 | Resin has solidified maintaining low level of birefringence. |
| 218 | Schlieren type textures developing. |
| 250 | High level of birefringence and Schlieren texture present in the solid. |

When cooled to room temperature (24° C.), the product retains its birefringence and Schlieren textures.

EXAMPLE 11

Preparation of a Casting of the Methylated p-Aminophenol Adduct of 4,4'-Diglycidyloxy-α-methylstilbene with 4,4'-Diglycidyloxy-α-methylstilbene The remaining blend of methylated p-aminophenol adduct of 4,4'-diglycidyloxy-α-methylstilbene with 4,4'-diglycidyloxy-α-methylstilbene from Example 10 is added to an aluminum pan and placed into an oven which has been preheated to 180° C. Within five minutes at 180° C., the powder melt flows to a rubbery solid. After a total of 1 hour at 180° C., the temperature in the oven is increased to 200° C. After one hour at 200° C., the temperature in the oven is increased to 230° C. After two hours at 230° C., the casting is recovered. Analysis of a portion of the semi-translucent, reddish brown colored casting via crosspolarized light microscopy at 70× magnification reveals a high level of birefringence. A portion (40.0 milligrams) of the cured casting of the adduct and epoxy resin blend is analyzed by differential scanning calorimetry using a heating rate of 10° C. per minute under a stream of nitrogen flowing at 35 cubic centimeters per minute and a temperature range from 30° to 300° C. A glass transition temperature of 150.7° C. is observed with an exothermic rise with an onset temperature of 263.6° C. A second scanning reveals a 150.6° C. glass transition temperature and an exothermic rise with an onset temperature of 270.1° C.

EXAMPLE 12

Copolymerization of Methylated p-Aminophenol Adduct of 4,4'-Diglycidyoxy-α-methylstilbene with 4,4'-Diglycidyloxy-α-methylstilbene Using 2:1 —NH to Epoxide Stoichiometry A portion (0.2407 gram, 0.001596>NH equivalent) of the methylated p-aminophenol adduct of 4,4'-diglycidyloxy-α-methylstilbene from Example 9-C and 4,4'-diglycidyloxy-α-methylstilbene (177.355 epoxide equivalent weight) (0.1415 gram, 0.000798 epoxide equivalent) are added to a ceramic mortar and ground together until a homogeneous powder is formed. A portion (13.5 milligrams) of the adduct and epoxy resin blend is analyzed by differential scanning calorimetry using a heating rate of 10° C. per minute under a stream of nitrogen flowing at 35 cubic centimeters per minute and a temperature range from 30° to 300° C. An endotherm is obtained with an onset temperature of 116.3° C., a minimum at 129.1° C., an endpoint temperature of 136.8° C. and an enthalpy of 17.5 joules per gram. An exotherm is obtained with an onset temperature of 205.0° C., a maximum at 215.9° C., an endpoint temperature of 224.8° C. and an enthalpy of 125.7 joules per gram. A second exotherm is obtained with an onset temperature of 230.3° C., a maximum at 234.4° C., an endpoint temperature of 244.4° C. and an enthalpy of 11.0 joules per gram. A second scanning reveals a 116.1° C. glass transition temperature and an exothermic rise with an onset temperature of 265.4° C. Analysis of the fused, opaque, brown colored solid product recovered from the differential scanning calorimetry analysis (second scanning) via crosspolarized light microscopy at 70× magnification reveals a high level of birefringence. Analysis of a portion of the methylated adduct and epoxy resin blend via crosspolarized light microscopy is completed using a microscope equipped with a programmable hot stage using a heating rate of 10° C. per minute and 70× magnification. The following results are obtained:

| Observed Transition Temperatures (°C.) | Comments |
|---|---|
| 30 | Opaque solid. |
| 128 | Melting observed. |
| 140 | Semi-solid containing large birefringent regions possessing liquid crystal texture. |
| 170 | Application of shear produces birefringent striations in the shear direction. |
| 184 | Resin has solidified with slight reduction in |

| Observed Transition Temperatures (°C.) | Comments |
| --- | --- |
|  | birefringence. |
| 250 | Same as at 184° C. |

When cooled to room temperature (24° C.), the product exhibits a high level of birefringence with some Schlieren textures.

EXAMPLE 13

Preparation of a Casting of the Methylated p-Aminophenol Adduct of 4,4'-Diglycidyloxy-α-methylstilbene with 4,4'-Diglycidyloxy-α-methylstilbene The remaining blend of methylated p-aminophenol adduct of 4,4'-diglycidyloxy-α-methylstilbene with 4,4'-diglycidyloxy-α-methylstilbene from Example 12 is added to an aluminum pan and placed into an oven which has been preheated to 180° C. Within two minutes at 180° C., the powder melt flows to an opaque solid. After a total of 1 hour at 180° C., the temperature in the oven is increased to 200° C. After one hour at 200° C., the temperature in the oven is increased to 230° C. After two hours at 230° C., the casting is recovered. Analysis of a portion of the opaque, reddish brown, colored casting via crosspolarized light microscopy at 70× magnification reveals a high level of birefringence. A portion (40.0 milligrams) of the cured casting of the adduct and epoxy resin blend is analyzed by differential scanning calorimetry using a heating rate of 10° C. per minute under a stream of nitrogen flowing at 35 cubic centimeters per minute and a temperature range from 30° to 300° C. No events are observed up to 254.1° C., at which temperature an exothermic rise begins. A second scanning reveals an increase in the onset temperature of the exothermic rise to 274.0° C.

EXAMPLE 14

A. Synthesis of o-Nitrophenol Adduct of 4,4'-Diglycidyloxy-α-methylstilbene 4,4'-Diglycidyloxy-α-methylstilbene (88.68 grams, 0.5 epoxide equivalent) and o-nitrophenol (70.25 grams, 0.505 mole) are added to a reactor equipped with a chilled glycol condenser and stirred as a powder under a nitrogen atmosphere. The 4,4'-diglycidyloxy-α-methylstilbene used has an epoxide equivalent weight (EEW) of 177.36 and exhibits monotropic liquid crystallinity with a 133° C. isotropization temperature, 94° C. onset to nematic liquid crystallinity and a 61° C. onset to crystallization. Heating commences and after nine minutes, 90° C. is achieved. At this temperature, ethyltriphenylphosphonium acetate.acetic acid complex catalyst (70% solids in methanol) (0.159 grams, 0.10% weight of the total reactants) is added to the stirred powder. Heating continues for eight more minutes until 150° C. is achieved then heating ceases. After three minutes, exothermic heating to a peak temperature of 187° C. occurs. After an additional seventeen minutes, the 150° C. temperature is reachieved and is held for the next eight hours. After this time, the product is recovered as an amber, transparent solid at 25° C. Epoxide titration of a portion of the product reveals the presence of no residual epoxide. Fourier transform infrared spectrophotometric analysis of a film of the product on a potassium chloride plate reveals the presence of the expected asymmetric nitro group stretching at 1530 cm$^{-1}$ and the symmetric nitro group stretching at 1350 cm$^{-1}$ and the hydroxyl group O—H stretching centered at 3475 cm$^{-1}$ (broad).

B. Hydrogenation of o-Nitrophenol Adduct of 4,4'-Diglycidyloxy-α-methylstilbene A portion (14.56 grams, 0,046 nitro equivalent) of o-nitrophenol adduct of 4,4'-diglycidyloxy-α-methylstilbene from A above is dissolved in 1,4-dioxane (50 grams) and added to a dropping funnel. Sodium hydrosulfite (85% technical) (47.11 grams, 0.23 mole active), anhydrous potassium carbonate (31.78 grams, 0.23 mole) and deionized water (250 grams) are added to a reactor and stirred to provide a solution. After cooling to 32° C., the 1,4-dioxane solution of the nitro adduct is added dropwise to the reactor over a one hour period and so as to maintain the reaction temperature between 32° and 38° C. The reaction product is maintained for an additional three hours while allowing the temperature to cool to 27° C. then stirring is shut off to allow separation of the aqueous and organic layers to occur. The bottom aqueous layer is pipetted off and discarded, while the top organic layer is rotary evaporated to a dry powder using final conditions of 50° C. and 1 mm Hg. Deionized water (200 milliliters) is added to the dry powder product followed by heating to 70° C. to provide a solution. While still hot, the solution is filtered through Celite then rotary evaporated to a total volume of 50 milliliters. After cooling to 24° C., ethanol (200 milliliters) is added to the product with shaking. The resulting slurry is filtered and the product recovered on the filter is dried in a vacuum oven at 80° C. and 1 mm Hg to a constant weight of 7.55 grams of light tan colored powder. Fourier transform infrared spectrophotometric analysis of a potassium bromide pellet of the product reveals the presence of the expected primary amine group N—H stretching and hydroxyl group O—H stretching at 3442 cm$^{-1}$, concurrent with complete disappearance of the asymmetric and symmetric nitro group stretching. Titration of a portion of the product demonstrates the presence of 3,616 milequivalents of —NH$_2$ per gram of product. This equates to a 276.55 —NH$_2$ equivalent weight, versus a 286.48 theoretical —NH$_2$ equivalent weight.

EXAMPLE 15

Copolymerization of o-Aminophenol Adduct of 4,4'-Diglycidyoxy-α-methylstilbene with 4,4'-Diglycidyloxy-α-methylstilbene A portion (0.2894 gram, 0.00209 >NH equivalent) of the o-aminophenol adduct of 4,4'-diglycidyloxy-α-methylstilbene from Example 10-B and 4,4'-diglycidyloxy-α-methylstilbene (177,355 epoxide equivalent weight) (0.3712 gram, 0.00209 epoxide equivalent) are added to a ceramic mortar and ground together until a homogeneous powder is formed. A portion (20.6 milligrams) of the adduct and epoxy resin blend is analyzed by differential scanning calorimetry using a heating rate of 10° C. per minute under a stream of nitrogen flowing at 35 cubic centimeters per minute and a temperature range from 30° to 300° C. An endotherm is obtained with an onset temperature of 125.2° C., a minimum at 135.6° C., an endpoint temperature of 141° C. and an enthalpy of 39.9 joules per gram. An exotherm is obtained with an onset temperature of 142.9° C., a maximum at 163.2° C., and an endpoint temperature of 204° C. A second exotherm is obtained with an onset temperature of 232.3° C., a maximum at 266.3, an endpoint temperature at 289° C. and an enthalpy of 61.4 joules per gram. A second scanning reveals no events up to 267.6° C., at which temperature an exothermic rise begins. Analysis of the opaque solid (fused) product from the differential scanning analysis via crosspolarized light microscopy at 70× magnification reveals a high level of birefringence.

EXAMPLE 16

A. Ethylation of the p-Nitrophenol Adduct of 4,4'-Diglycidyloxy-α-methylstilbene A portion (15.86 grams, 0.05 hydroxyl equivalent) of p-nitrophenol adduct of 4,4'-diglycidyloxy-α-methylstilbene from Example 9-A and acetone (100 milliliters) are added to a reactor and stirred under a nitrogen atmosphere to provide a solution. Sodium hydroxide (97%) (12.0 grams, 0.30 mole) dissolved in deionized water (18.0 grams) is added to a dropping funnel. Diethyl sulfate (23.13 grams, 0.15 mole) is added to a separate dropping funnel. While at room temperature (23° C.), a portion (7.5 milliliters) of the aqueous sodium hydroxide solution is added to the reactor followed by heating to 50° C. Once the 50° C. temperature is achieved, the remaining aqueous sodium hydroxide and diethyl sulfate are added simultaneously and dropwise to the reactor over a 15 minute period while maintaining the reaction temperature at 50° C. The reaction product is maintained for an additional 219 minutes at 50° C. The product is rotary evaporated to a dry powder using final conditions of 80° C. and 1 mm Hg. Deionized water (250 milliliters) and methylene chloride (250 milliliters) are added to the dry powder product to provide a solution. The methylene chloride layer is separated using a separatory funnel, then washed with two portions (100 milliliters) of deionized water. The methylene chloride layer is dried over anhydrous sodium sulfate then filtered. Rotary evaporation of the methylene chloride is completed using final conditions of 105° C. and 1 mm Hg to provide a constant weight of 16.89 grams of black brittle solid at 25° C. Fourier transform infrared spectrophotometric analysis of a neat film of the product on a potassium chloride plate reveals the complete disappearance of the hydroxyl group O—H stretching, the presence of the expected asymmetric nitro group stretching at 1497 cm$^{-1}$ and the symmetric nitro group stretching at 1344 cm$^{-1}$ and the appearance of —CH$_3$ group symmetric —C—H bending at 1390 cm$^{-1}$ and primary ether group —C—O stretching at 1111 cm$^{-1}$.

B. Hydrogenation of Ethylated p-Nitrophenol Adduct of 4,4'-Diglycidyloxy-α-methylstilbene A portion (16.87 grams, 0.0489 nitro equivalent) of ethylated p-nitrophenol adduct of 4,4'-diglycidyloxy-α-methylstilbene from A above is dissolved in 1,4-dioxane (80 grams) and then added to a dropping funnel. Sodium hydrosulfite (85% technical) (50.04 grams, 0.2443 mole active), anhydrous potassium carbonate (33.76 grams, 0.2443 mole), deionized water (250 grams) and 1,4-dioxane (150 grams) are added to a reactor and stirred to provide a solution. After cooling to 32° C., the 1,4-dioxane solution of the nitro adduct is added dropwise to the reactor over a twenty-five minute period and so as to maintain the reaction temperature at 32° C. The reaction product is maintained for an additional fifteen hours while allowing the temperature to cool to 22° C. then stirring is shut off to allow separation of the aqueous and organic layers to occur. The bottom aqueous layer is pipetted off and discarded, while the top organic layer is rotary evaporated to a dry powder using final conditions of 120° C. and 1 mm Hg. Methylene chloride (150 milliliters) is added to the dry powder product followed by mixing to provide a slurry. The slurry is filtered through a coarse fritted glass funnel then recovered and added to 75° C. deionized water (250 milliliters) with stirring. Once a stirred solution is obtained, isopropanol (1200 milliliters) is added in 300 milliliter portions to the stirred solution. After stirring the resulting slurry for thirty minutes, filtration through a medium fritted glass funnel is completed and the product recovered on the filter is washed with isopropanol (100 milliliters), then dried in a vacuum oven at 80° C. and 1 mm Hg to a constant weight of 10.9 grams of light tan colored powder. Fourier transform infrared spectrophotometric analysis of a neat film of the product on a potassium chloride plate reveals the presence of the expected primary amine group N—H stretching 3449 and 3256 (shoulder) cm$^{-1}$ concurrent with complete disappearance of the asymmetric and symmetric nitro group stretching, the —CH$_3$ group symmetric —C—H bending at 1384 cm$^{-1}$ and primary ether group —C—O stretching at 1111 cm$^{-1}$. Titration of a portion of the product demonstrates the presence of 3,075 milequivalents of —NH$_2$ per gram of product. This equates to a 325.20 —NH$_2$ equivalent weight, versus a 314.52 theoretical —NH$_2$ equivalent weight.

C. Analysis of the Ethylated p-Aminophenol Adduct of 4,4'-Diglycidyloxy-α-methylstilbene for Liquid Crystallinity A portion (28.5 milligrams) of the adduct from C above is analyzed by differential scanning calorimetry using a heating rate of 10° C. per minute under a stream of nitrogen flowing at 35 cubic centimeters per minute and a temperature range from 30° to 300° C. An exotherm is obtained with an onset temperature of 280.6° C., a maximum at 287.6° C., and an endpoint temperature > 300° C. Analysis of a portion of the ethylated adduct via crosspolarized light microscopy is completed using a microscope equipped with a programmable hot stage using a heating rate of 10° C. per minute and 70× magnification. The following results are obtained:

| Observed Transition Temperatures (°C.) | Comments |
| --- | --- |
| 30 | Birefringent, opaque powder. |
| 110 | First softening observed |
| 180 | Partial melt, birefringent. |
| 200 | Semi-solid, birefringent. |
| 245 | Partial isotropic, dispersed crystals present. |
| 277 | Viscous, translucent (non-birefringent) melt with dispersed crystals present. |
| 280 | Same as at 277° C., but less dispersed crystals present, begins to darken. |

When cooled to room temperature (24° C.), the product is semi-translucent with dispersed crystals and regions which exhibit birefringence.

EXAMPLE 17

Copolymerization of Ethylated p-Aminophenol Adduct of 4,4'-Diglycidyoxy-α-methylstilbene with 4,4'-Diglycidyloxy-α-methylstilbene Using 1:1 —NH to Epoxide Stoichiometry A portion (0.3263 gram, 0.00201>NH equivalent) of the ethylated p-aminophenol adduct of 4,4'-diglycidyloxy-α-methylstilbene from Example 16-B and 4,4'-diglycidyloxy-α-methylstilbene (177.355 epoxide equivalent weight) (0.3559 gram, 0.00201 epoxide equivalent) are added to a ceramic mortar and ground together until a homogeneous powder is formed. A portion (17.7 milligrams) of the adduct and epoxy resin blend is analyzed by differential scanning calorimetry using a heating rate of 10° C. per minute under a stream of nitrogen flowing at 35 cubic centimeters per minute and a temperature range from 30° to 300° C. An endotherm is obtained with an onset temperature of 120.6° C., a minimum at 132.5° C., an endpoint temperature of 145.7° C. and an enthalpy of 40.6 joules per gram. An exotherm is obtained with an onset temperature of 185.6° C., a maximum at 202.1° C., an endpoint temperature of 222.8° C. and an enthalpy of 97.3 joules per gram. A second scanning reveals a 124.0° C. glass transition temperature and an exothermic rise with an onset temperature of 203.8° C. Analysis of the fused, opaque, dark reddish black colored solid product recovered from the differential scanning calorimetry analysis (second scanning) via crosspolarized light microscopy at 70× magnification revealed a high level of birefringence with liquid crystal textures present. Analysis of a portion of the ethylated adduct and epoxy resin blend via crosspolarized light microscopy is completed using a microscope equipped with a programmable hot stage using a heating rate of 10° C. per minute and 70× magnification. The following results are obtained:

| Observed Transition Temperatures (°C.) | Comments |
| --- | --- |
| 30 | Birefringent solid. |
| 95 | Partial softening observed. |
| 121 | Melting observed. |
| 132 | Partial melt (non-birefringent) plus agglomerated birefringent regions. |
| 220 | Some clearing of agglomerated birefringent regions observed. |
| 230 | Resin is starting to solidify, birefringent textures and agglomerated birefringent regions are present. |
| 240 | Resin has thermoset, birefringent agglomerated regions have cleared, material has darkened. |

When cooled to room temperature (24° C.), the brown colored product is highly birefringent. Analysis of a second portion of the adduct and epoxy resin blend via crosspolarized light microscopy is completed using a microscope equipped with a programmable hot stage preheated to 180° C. A partial melt is achieved within 20 seconds followed by mixing of the resin by moving the coverslip on the glass microscope slide. After 2.5 minutes a semi-solid with birefringent textures is observed. After 6 minutes, the resin appears unchanged. Upon cooling to room temperature (24° C.), an opaque, light brown colored solid is obtained which exhibits a high level of birefringence.

EXAMPLE 18

Copolymerization of Ethylated p-Aminophenol Adduct of 4,4'-Diglycidyoxy-α-methylstilbene with 4,4'-Diglycidyloxy-α-methylstilbene Using 2:1 —NH to Epoxide Stoichiometry A portion (0.3072 gram, 0.001889>NH equivalent) of the methylated p-aminophenol adduct of 4,4'-diglycidyloxy-α-methylstilbene from Example 16-B and 4,4'-diglycidyloxy-α-methylstilbene (77,355 epoxide equivalent weight) (0.1675 gram, 0.000944 epoxide equivalent) are added to a ceramic mortar and ground together until a homogeneous powder is formed. A portion (20.8 milligrams) of the adduct and epoxy resin blend is analyzed by differential scanning calorimetry using a heating rate of 10° C. per minute under a stream of nitrogen flowing at 35 cubic centimeters per minute and a temperature range from 30° to 250° C. An endotherm is obtained with an onset temperature of 19.9° C., a minimum at 130.3° C., an endpoint temperature of 139.5° C. and an enthalpy of 21.6 joules per gram. An exotherm is obtained with an onset temperature of 187.5° C., a maximum at 200.6° C., an endpoint temperature of 217.9° C. and an enthalpy of 122.6 joules per gram. A second scanning reveals a 120.7° C. glass transition temperature and an exothermic rise with an onset temperature of 241.7° C. Analysis of the fused, opaque, dark reddish black colored solid product recovered from the differential scanning calorimetry analysis (second scanning) via crosspolarized light microscopy at 70× magnification reveals a high level of birefringence with liquid crystal textures present. Analysis of a portion of the ethylated adduct and epoxy resin blend via crosspolarized light microscopy is completed using a microscope equipped with a programmable hot stage using a heating rate of 10° C. per minute and 70× magnification. The following results are obtained:

| Observed Transition Temperatures (°C.) | Comments |
| --- | --- |
| 30 | Birefringent solid. |
| 115 | Partial softening observed. |
| 122 | Partial melting observed. |
| 132 | Partial melt (non-birefringent) plus agglomerated birefringent regions. |
| 200 | Resin is semi-solid with some clearing of agglomerated birefringent regions. |
| 240 | Resin has thermoset, birefringent agglomerated regions have cleared. |

When cooled to room temperature (24° C.), the brown colored, semi-translucent product is birefringent. Analysis of a second portion of the adduct and epoxy resin blend via crosspolarized light microscopy is completed using a microscope equipped with a programmable hot stage preheated to 185° C. A partial melt is achieved within 30 seconds followed by mixing of the resin by moving the coverslip on the glass microscope slide. After 2 minutes a semi-solid with birefringent textures is observed. After 6 minutes, the resin appears unchanged. Upon cooling to room temperature (24° C.), a semi-translucent, light brown colored solid is obtained which exhibits birefringent textures.

EXAMPLE 19

A. Synthesis of o-Nitrophenol Adduct of 4,4'-Diglycidyloxy-α-methylstilbene 4,4'-Diglycidyloxy-α-methylstilbene (53.51 grams, 0.30 epoxide equivalent) and o-nitrophenol (42.15 grams, 0.303 mole) are added to a reactor equipped with a chilled glycol condenser and stirred as a powder under a nitrogen atmosphere. The 4,4'-diglycidyloxyα-methylstilbene used has an epoxide equivalent weight (EEW) of 178.36 and exhibits monotropic liquid crystallinity with a 129.9° C. isotropization temperature, 92.9° C. onset to nematic liquid crystallinity and a 67° C. onset to crystallization. Heating commences until 140° C. is reached with formation of a solution. After cooling to 100° C., ethyltriphenylphosphonium acetate.acetic acid complex catalyst (70% solids in methanol) (0.096 grams, 0.10% weight of the total reactants) dissolved in methylene chloride (6 milliliters) is added to the stirred powder. Heating continues for ten minutes until 50° C. is achieved then heating ceases. After 263 minutes at the 150° C. temperature the product is recovered as a light amber, transparent solid at 25° C. Epoxide titration of a portion of the product reveals the presence of no residual epoxide. Fourier transform infrared spectrophotometric analysis of a film of the product on a potassium chloride plate reveals the presence of the expected asymmetric nitro group stretching at 1523 cm$^{-1}$ and the symmetric nitro group stretching at 1350 cm$^{-1}$ and the hydroxyl group O—H stretching centered at 3473 cm$^{-1}$ (broad).

B. Methylation of the o-Nitrophenol Adduct of 4,4'-Diglycidyloxy-α-methylstilbene A portion (31.73 grams, 0.10 hydroxyl equivalent) of o-nitrophenol adduct of 4,4'-diglycidyloxy-α-methylstilbene from A above and acetone (200 milliliters) are added to a reactor and stirred under a nitrogen atmosphere to provide a solution. Sodium hydroxide (97%) (24.0 grams, 0.60 mole) dissolved in deionized water (36.0 grams) is added to a dropping funnel. Dimethyl sulfate (37.84 grams, 0.30 mole) is added to a separate dropping funnel. While at room temperature (21° C.), a portion (15 milliliters) of the aqueous sodium hydroxide solution is added to the reactor followed by heating to 52° C. Once the 52° C. temperature is achieved, the remaining aqueous sodium hydroxide and dimethyl sulfate are added simultaneously and dropwise to the reactor over a five minute period while maintaining the reaction temperature at 52° C. The reaction product is maintained for an additional 3 hours at 50°-52° C. The product is rotary evaporated to a dry powder using final conditions of 100° C. and 1 mm Hg. Deionized water (250 milliliters) and methylene chloride (250 milliliters) are added to the dry powder product to provide a solution. The methylene chloride layer is separated using a separatory funnel. A second portion (250 milliliters) of methylene chloride is used to extract the water layer, then separated using a separatory funnel. The combined methylene chloride extracts are dried over anhydrous sodium sulfate then filtered. Rotary evaporation of the methylene chloride is completed using final conditions of 105° C. and 1 mm Hg to provide a constant weight of 32.3 grams of black brittle solid at 25° C. Fourier transform infrared spectrophotometric analysis of a neat film of the product on a potassium chloride plate reveals the complete disappearance of the hydroxyl group O—H stretching, the presence of the expected asymmetric nitro group stretching at 1497 cm$^{-1}$ and the symmetric nitro group stretching at 1350 cm$^{-1}$ and the appearance of methoxy group —C—H stretching at 2831 cm$^{-1}$.

C. Hydrogenation of Methylated o-Nitrophenol Adduct of 4,4'-Diglycidyloxy-α-methylstilbene A portion (32.2 grams, 0.0972 nitro equivalent) of methylated o-nitrophenol adduct of 4,4'-diglycidyloxy-α-methylstilbene from B above is dissolved in 1,4-dioxane (160 grams) and then added to a dropping funnel. Sodium hydrosulfite (85% technical) (99.55 grams, 0.4860 mole active), anhydrous potassium carbonate (67.17 grams, 0.4860 mole), deionized water (500 grams) and 1,4-dioxane (300 grams) are added to a reactor and stirred to provide a solution. After cooling to 28° C., the 1,4-dioxane solution of the nitro adduct is added dropwise to the reactor over a 65 minute period and so as to maintain the reaction temperature at 28° C. The reaction product is maintained for an additional seventeen hours while allowing the temperature to cool to 22° C. then stirring is shut off to allow separation of the aqueous and organic layers to occur. The bottom aqueous layer is pipetted off and discarded, while the top organic layer is rotary evaporated to a dry powder using final conditions of 120° C. and 1 mm Hg. The dry powder product is added to 70° C. deionized water (400 milliliters) with stirring. Once a stirred solution is obtained it is allowed to cool to 25° C., then isopropanol (2500 milliliters) is added in 300 milliliter portions to the stirred solution. After stirring the resulting slurry for thirty minutes, then holding for 16 hours, filtration through a medium fritted glass funnel is completed and the product recovered on the filter is washed with isopropanol (200 milliliters), then dried in a vacuum oven at 80° C. and 1 mm Hg to a constant weight of 19.15 grams of white powder. Fourier transform infrared spectrophotometric analysis of a neat film of the product on a potassium chloride plate reveals the presence of the expected primary amine group N—H stretching at 3436 and 3389 cm$^{-1}$, concurrent with complete disappearance of the asymmetric and symmetric nitro group stretching, and the methoxy group C—H stretching at 2831 cm$^{-1}$. Titration of a portion of the product demonstrates the presence of 3.2981 milequivalents of —NH$_2$ per gram of produce. This equates to a 303.21 —NH$_2$ equivalent weight, versus a 301.51 theoretical —NH$_2$ equivalent weight.

D. Analysis of the Methylated o-Aminophenol Adduct of 4,4'-Diglycidyloxy-α-methylstilbene for Liquid Crystallinity A portion (23.5 milligrams) of the adduct from C above is analyzed by differential scanning calorimetry using a heating rate of 10° C. per minute under a stream of nitrogen flowing at 35 cubic centimeters per minute and a temperature range from 30° to 300° C. An endotherm is obtained with an onset temperature of 84.5° C., a maximum at 103.4° C., and an endpoint temperature 154.3° C. and an enthalpy of 5.50 joules per gram. A pair of exotherms follow with onset temperatures of 224.2 and 251.4° C., maxima at 234.9 and 274.9° C., endpoint temperatures of 251.4° and 291.9° C., and enthalpies of 22.2 and 18.7 joules per gram, respectively.

Analysis of a portion of the methylated adduct via crosspolarized light microscopy is completed using a microscope equipped with a programmable hot stage using a heating rate of 10° C. per minute and 70× magnification. The following results are obtained:

| Observed Transition Temperatures (°C.) | Comments |
| --- | --- |
| 25 | Crystalline birefringent powder. |
| 145 | First softening observed. |
| 163 | Birefringent fluid, suspended crystals observed. |
| 205 | Crystals dissolved, changes to fine grained uniform appearing birefringent fluid. |
| 225 | Mobile birefringent fluid. |
| 243 | Viscosity builds, birefringent fluid. |
| 265 | Tacky solid, birefringent, darkens. |

When cooled to room temperature (24° C.), the product retains its birefringent appearance.

EXAMPLE 20

Copolymerization of Methylated o-Aminophenol Adduct of 4,4'-Diglycidyoxy-α-methylstilbene with 4,4'-Diglycidyloxy-α-methylstilbene Using 1:1 —NH to Epoxide Stoichiometry A portion (0.3326 gram, 0.002194>NH equivalent) of the methylated o-aminophenol adduct of 4,4'-diglycidyloxy-α-methylstilbene from Example 19-C and 4,4'-diglycidyloxy-α-methylstilbene (178,362 epoxide equivalent weight) (0.3913 gram, 0.002194 epoxide equivalent) are added to a ceramic mortar and ground together until a homogeneous powder is formed. The 4,4'-diglycidyloxy-α-methylstilbene used has an epoxide equivalent weight (EEW) of 178.36 and exhibits monotropic liquid crystallinity with a 129.9° C. isotropization temperature, 92.9 onset to nematic liquid crystallinity and a 67° C. onset to crystallization. A portion (19.0 milligrams) of the adduct and epoxy resin blend is analyzed by differential scanning calorimetry using a heating rate of 10° C. per minute under a stream of nitrogen flowing at 35 cubic centimeters per minute and a temperature range from 30° to 300° C. An exotherm is obtained with an onset temperature of 61.3° C., a maximum at 78.5° C., an endpoint temperature of 103.3° C. An endotherm is obtained with an onset temperature of 103.3° C., a minimum at 128.8° C., an endpoint temperature of 135.2° C. and an enthalpy of 34.7 joules per gram. A pair of exotherms follow with onset temperatures of 135.2° and 217.3° C., maxima at 180.0 and 226.4° C., endpoint temperatures of 215.9° and 239.9° C. followed by an exothermic rise and enthalpies of 56.6 and 24.1 joules per gram, respectively. Analysis of the fused, light brown colored solid product recovered from the differential scanning calorimetry analysis via crosspolarized light microscopy at 70× magnification revealed a high level of birefringence with nematic textures present.

What is claimed is:

1. An adduct containing terminating nitro or nitroso groups and one or more rodlike mesogenic moieties per molecule which adduct results from the reaction of
   (A) one or more compounds containing an average of more than one vicinal epoxide group per molecule and
   (B) one or more compounds containing one or more nitro or nitroso groups and one hydrogen atom per molecule which is reactive with an epoxide group thereby forming an adduct essentially free of epoxy groups and containing nitro groups;
with the proviso that said at least one or more rodlike mesogenic moieties per molecule are present in either component (A) or (B) or in both components (A) and (B), wherein components (A) and (B) are employed in amounts which provide a ratio of equivalents of hydrogen reactive with an epoxide group, excluding secondary hydroxyl groups formed by epoxide ring opening reaction to form the adduct, per equivalent of epoxide reacted of from about 1:1 to about 100:1.

2. A nitro or nitroso group terminated adduct of claim 1 wherein component (A) contains a compound containing one or more rodlike mesogenic moieties per molecule.

3. A nitro or nitroso group terminated adduct of claim 2 wherein component (A) is a compound represented by the following Formulas II, V, VI or IX

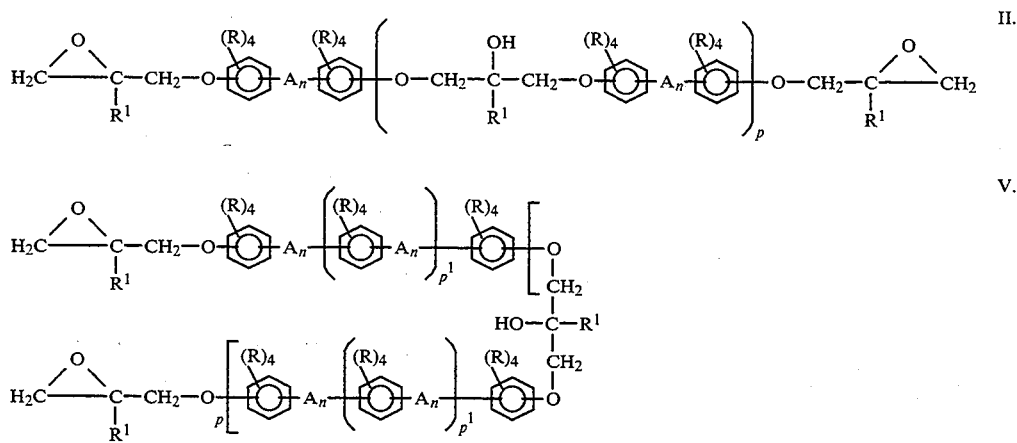

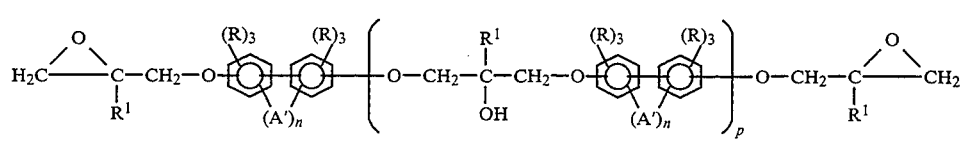
Formula VI.

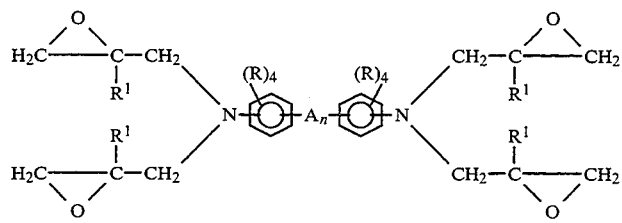
Formula IX.

wherein each A is independently selected from the group consisting of a direct single bond, —$CR^1$=$CR^1$—, —C≡C—, —N=N—, —$CR^1$=N—, —O—CO—, —$NR^1$—CO—, —$CR^1$=N—N=$CR^1$—, —$CR^1$=$CR^1$—CO—, —N=$CR^1$—, —CO—O—, —CO—$NR^1$—, —CO—$CR^1$=$CR^1$—, —CO—O—N=$CR^1$, —$CR^1$=N—O—OC—, —CO—$NR^1$—$NR^1$—OC—, —$CR^1$=$CR^1$—O—OC—, —CO—O—$CR^1$=$CR^1$—, —O—OC—$CR^1$=$CR^1$—, —$CR^1$=$CR^1$—CO—O—, —(CHR$^1$)$_{n'}$—O—CO—$CR^1$=$CR^1$—, —$CR^1$=$CR^1$—$R^1$—CO—O—(CHR$^1$)$_{n'}$—, —(CHR$^1$)$_{n'}$—CO—O—$CR^1$=$CR^1$—, —$CR^1$=$CR^1$—$R^1$—O—CO—(CHR$^1$)$_{n'}$—, —CO—S—, —S—OC—, —$CH_2$—$CH_2$—CO—O—, —O—OC—$CH_2$—$CH_2$—, —C≡C—C≡C—, —$CR^1$=$CR^1$—$CR^1$=$CR^1$—,

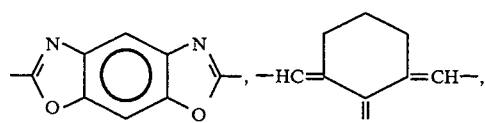

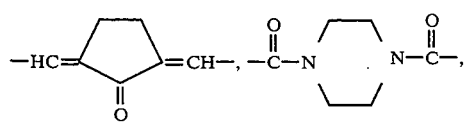

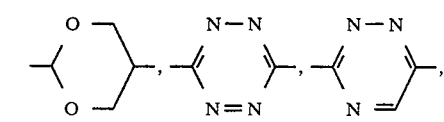

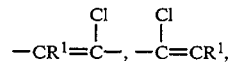

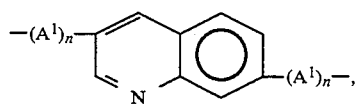

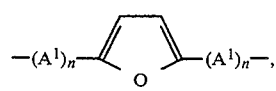

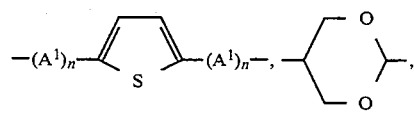

-continued

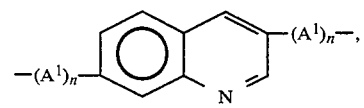

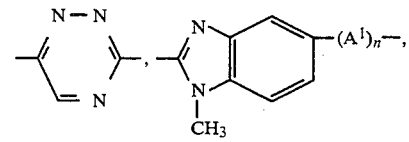

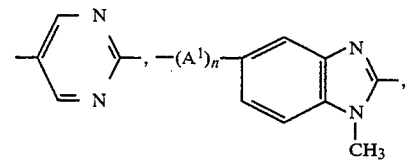

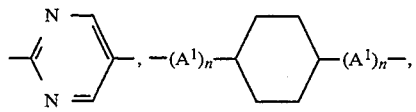

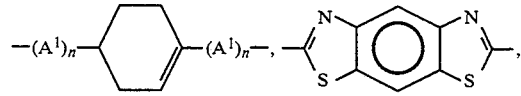

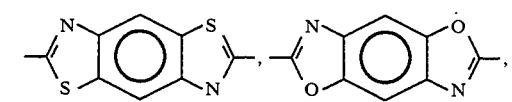

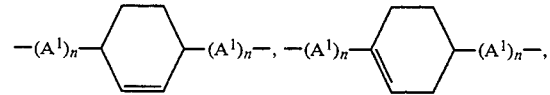

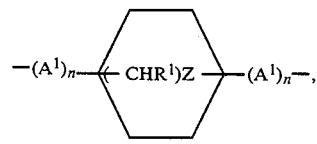

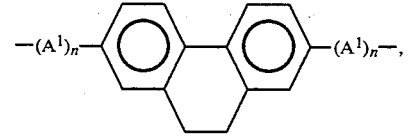

-continued

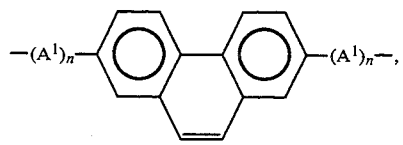

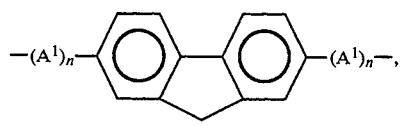

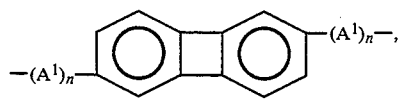

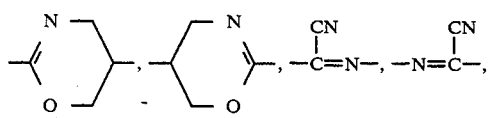

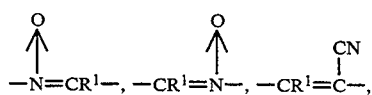

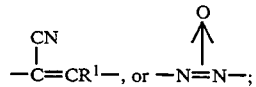

A' is a divalent hydrocarbyl group having from 1 to about 10 carbon atoms and in Formula VI, A' can also contain one or more heteroatoms selected from N, O and S and may be saturated or unsaturated; each $A^1$ is independently a

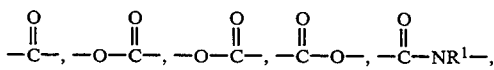

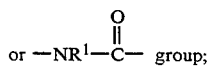

each R is independently hydrogen or a hydrocarbyl or hydrocarbyloxy group having from 1 to about 10 carbon atoms, a halogen atom, a nitro group, a nitrile group, a phenyl group or a —CO—$R^1$ group; each $R^1$ is independently hydrogen or a hydrocarbyl group having 1 to about 3 carbon atoms; n is zero or 1; n' has a value from 1 to about 6; z has a value of one or two; p has a value from zero to about 30; $p^1$ has a value from 1 to about 30; and the aromatic rings can optionally contain one or more heteroatoms selected from the group consisting of N, O and S; with the proviso that at least 80% of the molecules are para substituted by the bridging groups (—A— in Formulas II, V IX and by the direct bond in Formula VI), the substituent containing the glycidyl group(s),

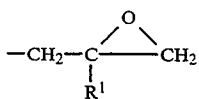

and the substituent containing the secondary hydroxy alkylidene group(s), —CH$_2$—C(OH)(R$^1$)—CH$_2$—, which are present when p or $p^1$ has a value greater than zero.

4. A nitro or nitroso group terminated adduct of claim 2 wherein component (A) is the diglycidyl ether of 4,4'-dihydroxy-α-methylstilbene, 4,4'-dihydroxystilbene, 4,4'-dihydroxybenzanilide, 4,4'-dihydroxybiphenyl, 4-hydroxyphenyl-4-hydroxybenzoate, N,N'-bis(4-hydroxyphenyl)terephthalamide, bis(4-hydroxyphenyl)terephthalate, or any combination thereof.

5. A nitro or nitroso group terminated adduct of claim 1 wherein component (B) contains a compound containing one or more mesogenic moieties per molecule.

6. A nitro or nitroso group terminated adduct of claim 5 wherein component (B) is selected from the group consisting of: (a) nitro and nitrosophenols, (b) nitro and nitrosocarboxylic acids, (c) nitro and nitrosomercaptans, (d) nitro and nitroso secondary monoamines, and (e) any combination of any two or more of such materials.

7. A nitro or nitroso group terminated adduct of claim 5 wherein component (B) is a nitro or nitrosophenol represented by the Formulas XXI, XXIII or XXIV

Formula XXI.

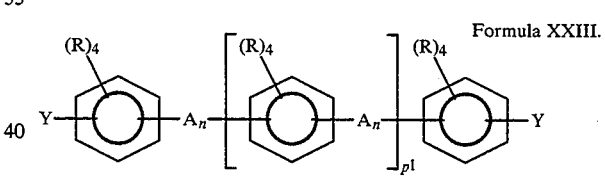

Formula XXIII.

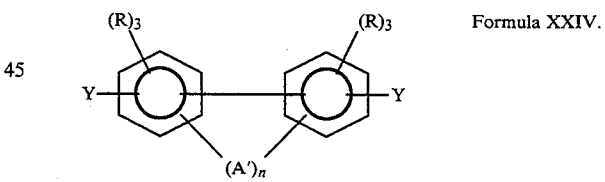

Formula XXIV.

wherein each A is independently selected from the group consisting of a direct single bond, —CR$^1$=CR$^1$—, —C≡C—, —N=N—, —CR$^1$=N—, —O—CO—, —NR$^1$—CO—, —CR$^1$=N—N=CR$^1$—, —CR$^1$=CR$^1$—CO—, —N=CR$^1$—, —CO—O—, —CO—NR$^1$—, —CO—CR$^1$=CR$^1$—, —CO—O—N=CR$^1$, —CR$^1$=N—O—OC—, —CO—NR$^1$—NR$^1$—OC—, —CR$^1$=CR$^1$—O—OC—, —CO—O—CR$^1$=CR$^1$—, —O—OC—CR$^1$=CR$^1$—, —CR$^1$=CR$^1$—CO—O—, —(CHR$^1$)$_{n'}$—O—CO—CR$^1$=CR$^1$—, —CR$^1$=CR$^1$—CO—O—(CHR$^1$)$_{n'}$—, —(CHR$^1$)$_{n'}$—CO—O—CR$^1$=CR$^1$—, —CR$^1$=CR$^1$—O—CO—(CHR$^1$)$_{n'}$—, —CO—S—, —S—OC—, —CH$_2$—CH$_2$—CO—O—, —O—OC—CH$_2$—CH$_2$—, —C≡C—C≡C—, —CR$^1$=CR$^1$—CR$^1$=CR$^1$—,

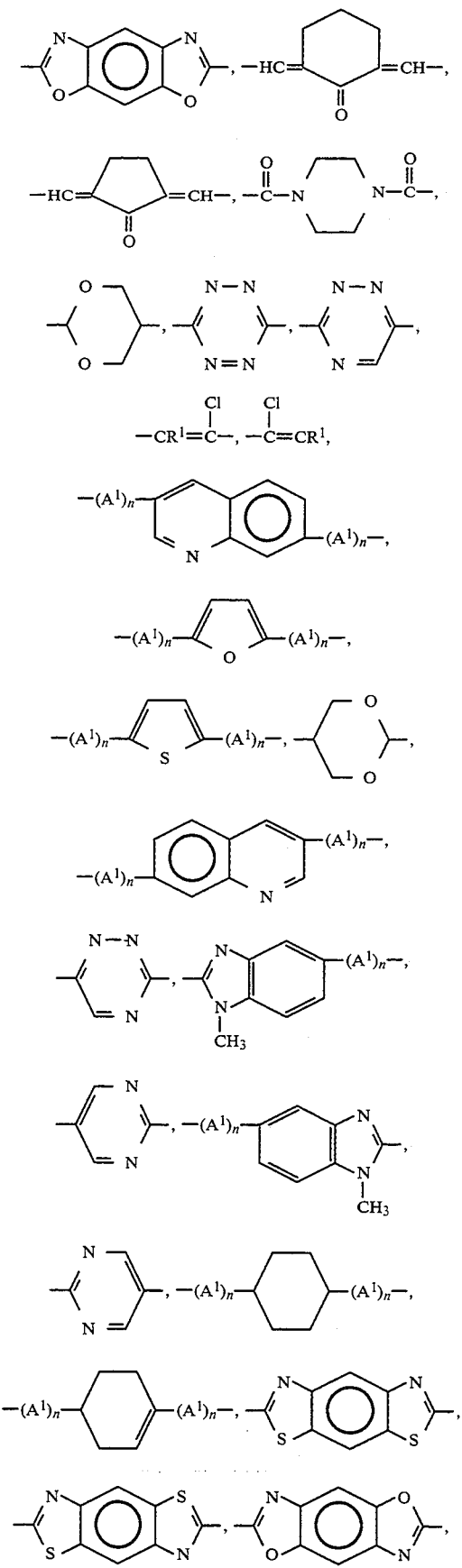

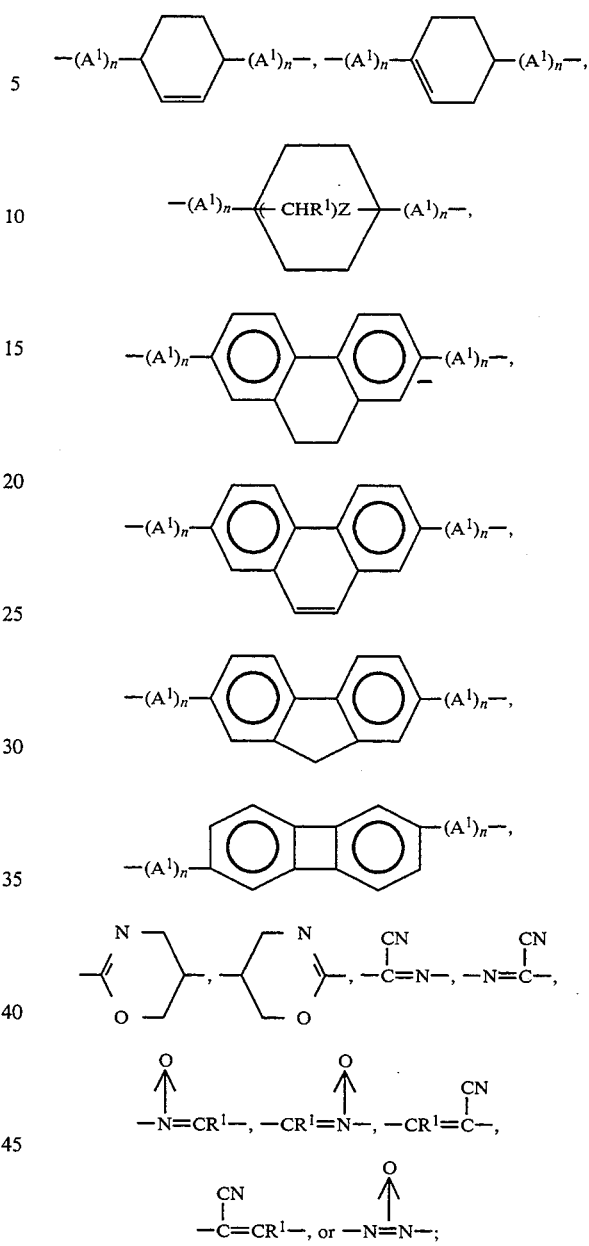

A' is a divalent hydrocarbyl group having from 1 to about 10 carbon atoms and A' in Formula XXIV can also contain one or more heteroatoms selected from N, O and S and may be saturated or unsaturated; each $A^1$ is independently a

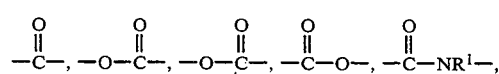

group;

one Y is a —OH group and the other Y becomes a R group and one or more of the groups represented by R is a nitro or nitroso group; each R is independently hydrogen or a hydrocarbyl or hydrocarbyloxy group having from 1 to about 10 carbon atoms, a halogen atom, a nitro group, a nitroso group, a nitrile group, a phenyl group or a —CO—R¹ group; each R¹ is independently hydrogen or a hydrocarbyl group having 1 to about 3 carbon atoms; n is zero or 1; n' has a value from 1 to about 6; z has a value of one or two; p¹ has a value from 1 to about 30; and the aromatic rings can optionally contain one or more heteroatoms selected from the group consisting of N, O and S; with the proviso that at least about 80% of the molecules are para substituted by both the bridging groups (—A— in Formulas XXI and XXIII, the direct bond in Formula XXIV) and the hydroxyl group (—OH).

8. A nitro or nitroso group terminated adduct of claim 7 wherein component (B) is 4-hydroxy-4'-nitrobiphenyl, 4-hydroxy-4'-nitrostilbene, 4-hydroxy-4'-nitrodiphenylazomethine, 4-hydoxy-4'-nitroazoxybenzene, 4-hydroxy-4'-nitrobenzanilide, 4-nitro-4'-hydroxybenzanilide, 4-hydroxyphenyl-4'-nitrobenzoate, 4-hydroxy-4'-nitro-alpha-chlorostilbene, or any combination thereof.

9. A nitro or nitroso group terminated adduct of claim 5 wherein component (B) is a nitro or nitrosocarboxylic acid represented by the following Formulas XXI, XXIV or XXV

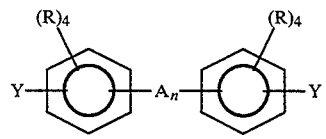
Formula XXI.

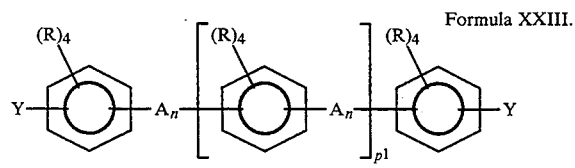
Formula XXIII.

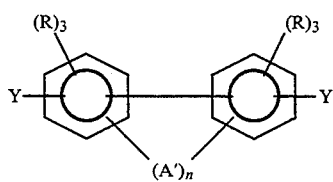
Formula XXIV.

wherein each A is independently selected from the group consisting of a direct single bond, —CR¹=CR¹—, —C≡—, —N=N—, —CR¹=N—, —O—CO—, —NR¹—CO—, —CR¹=N—N=CR¹—, —CR¹=CR¹—CO—, —N=CR¹—, —CO—O—, —CO—NR¹—, —CO—CR¹=CR¹—, —CO—O—N=CR¹, —CR¹=N—O—CO—, —CO—NR¹—NR¹—OC—, —CR¹=CR¹—O—OC—, —CO—O—CR¹=CR¹—, —O—OC—CR¹=CR¹—, —CR¹=CR¹—CO—O—, —(CHR¹)ₙ'—O—CO—CR¹=CR¹—, —CR¹=CR¹—CO—O—(CHR¹)ₙ'—, —(CHR¹)ₙ'—CO—O—CR¹=CR¹—, —CR¹=CR¹—O—CO—(CHR¹)ₙ'—, —CO—S—, —S—OC—, —CH₂—CH₂—CO—O—, —O—OC—CH₂—CH₂—, —C≡C—C≡C—, —CR¹=CR¹—CR¹=CR¹—,

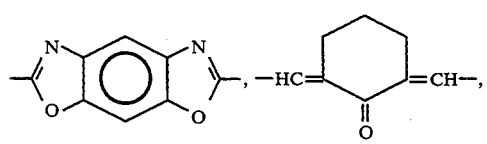

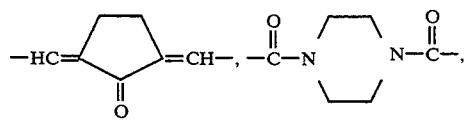

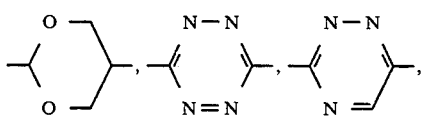

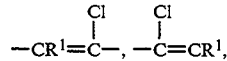

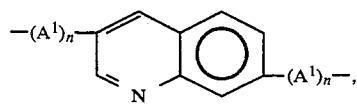

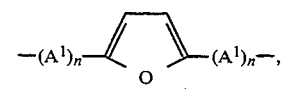

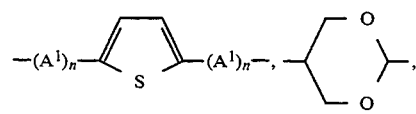

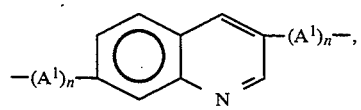

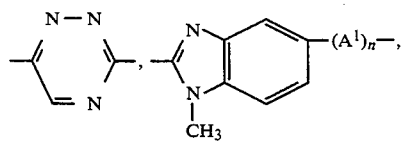

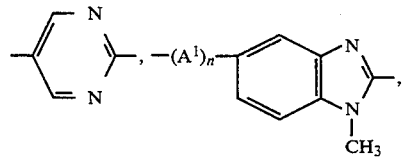

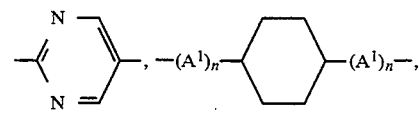

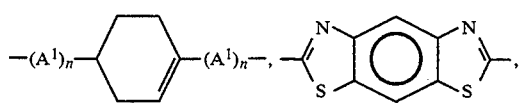

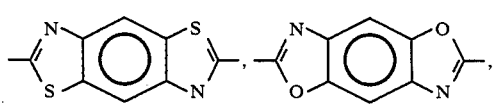

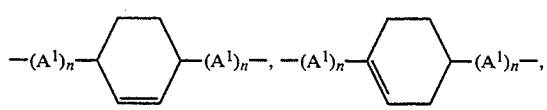

-continued

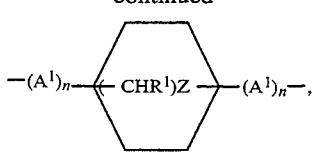

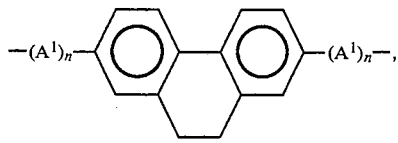

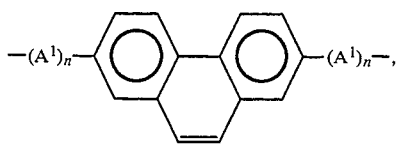

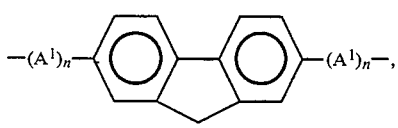

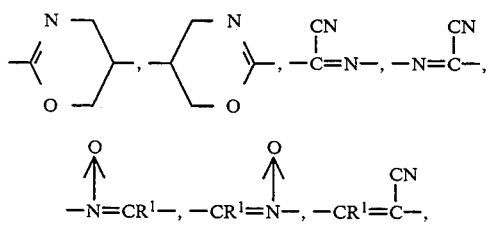

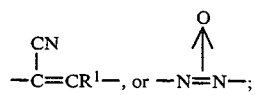

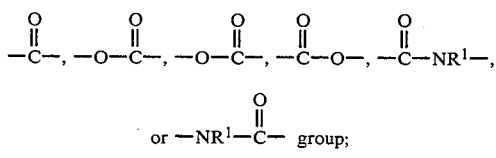

A' is a divalent hydrocarbyl group having from 1 to about 10 carbon atoms and A' in Formula XXIV can also contain one or more heteroatoms selected from N, O and S and may be saturated or unsaturated; each $A^1$ is independently a $$-\overset{O}{\underset{\|}{C}}-,\ -O-\overset{O}{\underset{\|}{C}}-,\ -O-\overset{O}{\underset{\|}{C}}-,\ -\overset{O}{\underset{\|}{C}}-O-,\ -\overset{O}{\underset{\|}{C}}-NR^1-,$$

or $-NR^1-\overset{O}{\underset{\|}{C}}-$ group;

one Y is a —COOH group and the other Y becomes a R group and one or more of the groups represented by R is a nitro or nitroso group; each R is independently hydrogen or a hydrocarbyl or hydrocarbyloxy group having from 1 to about 10 carbon atoms, a halogen atom, a nitro group, a nitroso group, a nitrile group, a phenyl group or a —CO—$R^1$ group; each $R^1$ is independently hydrogen or a hydrocarbyl group having 1 to about 3 carbon atoms; n is zero or 1; n' has a value from 1 to about 6; z has a value of one or two; $p^1$ has a value from 1 to about 30; and the aromatic rings can optionally contain one or more heteroatoms selected from the group consisting of N, O and S; with the proviso that at least 80% of the molecules are para substituted by the bridging groups (—A— in Formulas XXI and XXIII, the direct bond in Formula XXIV) and the carboxyl group (—COOH).

10. A nitro or nitroso group terminated adduct of claim 9 wherein component (B) is 4-carboxy-4'-nitrobiphenyl, 4-carboxy-4'-nitrostilbene, 4-carboxy-4'-nitrodiphenylazomethine, 4-carboxy-4'-nitroazoxybenzene, 4-carboxy-4'-nitrobenzanilide, 4-nitro-4'-carboxybenzanilide, 4-carboxyphenyl-4'-nitrobenzoate, 4-carboxy-4'-nitro-alpha-chlorostilbene, or any combination thereof.

11. A nitro or nitroso group terminated adduct of claim 5 wherein component (B) is a nitro or nitrosomercaptan represented by the following Formulas XXI, XXIII or XXIV Formula XXI.

Formula XXIII.

Formula XXIV.

wherein each A is independently selected from the group consisting of a direct single bond, —$CR^1$=$CR^1$—, —C≡C—, —N=N—, —$CR^1$=N—, —O—CO—, —$NR^1$—CO—, —$CR^1$=N—N=$CR^1$—, —$CR^1$=$CR^1$—CO—, —N=$CR^1$—, —CO—O—, —CO—$NR^1$—, —CO—$CR^1$=$CR^1$—, —CO—O—N=$CR^1$, —$CR^1$=N—O—OC—, —CO—$NR^1$—$NR^1$—OC—, —$CR^1$=$CR^1$—O—OC—, —CO—O—$CR^1$=$CR^1$—, —O—OC—$CR^1$=$CR^1$—, —$CR^1$=$CR^1$—CO—O—, —(CHR$^1$)$_{n'}$—O—CO—$CR^1$=$CR^1$—, —$CR^1$=$CR^1$—CO—O—(CHR$^1$)$_{n'}$—, —(CHR$^1$)$_{n'}$—CO—O—$CR^1$=$CR^1$—, —$CR^1$=$CR^1$—O—CO—(CHR$^1$)$_{n'}$—, —CO—S—, —S—OC—, —$CH_2$—$CH_2$—CO—O—, —O—OC—$CH_2$—$CH_2$—, —C≡C—C≡C—, —$CR^1$=$CR^1$—$CR^1$=$CR^1$—,

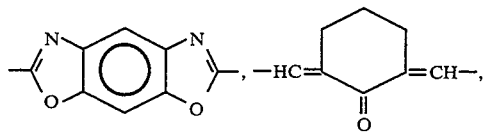

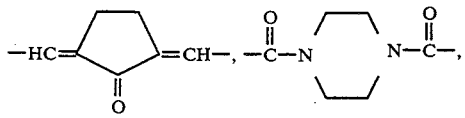

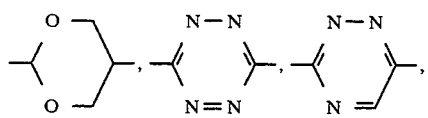
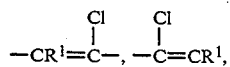
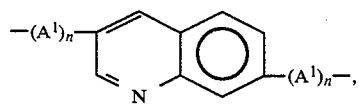
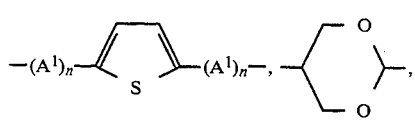
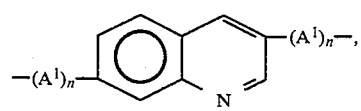
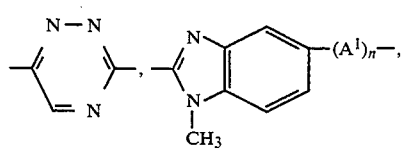
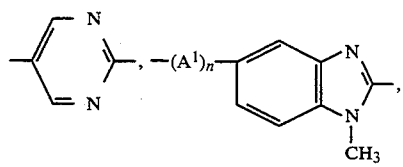
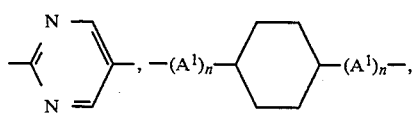
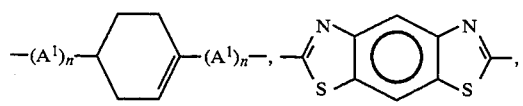
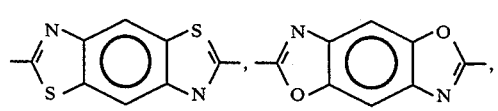
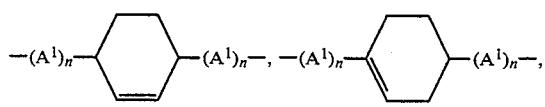
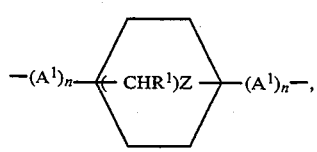

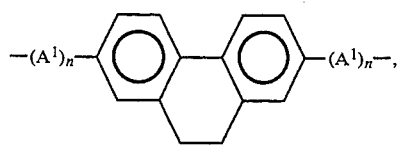
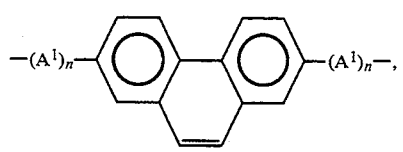
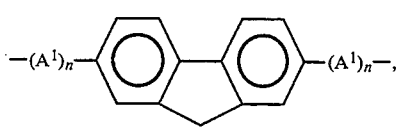
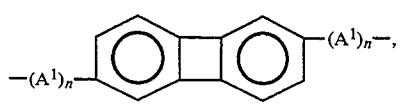
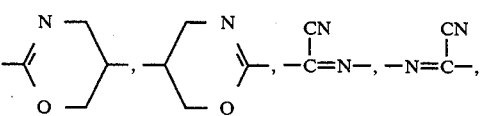
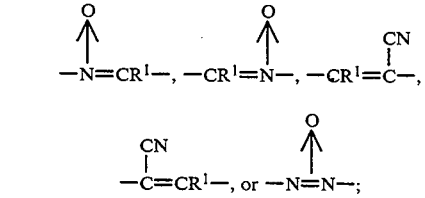
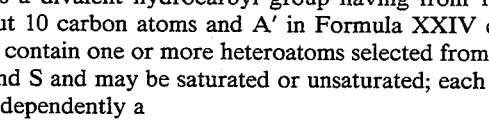
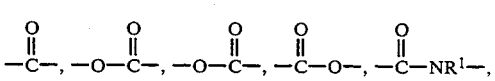
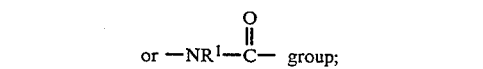

A' is a divalent hydrocarbyl group having from 1 to about 10 carbon atoms and A' in Formula XXIV can also contain one or more heteroatoms selected from N, O and S and may be saturated or unsaturated; each $A^1$ is independently a $$-\overset{O}{\underset{\|}{C}}-,\ -O-\overset{O}{\underset{\|}{C}}-,\ -O-\overset{O}{\underset{\|}{C}}-,\ -\overset{O}{\underset{\|}{C}}-O-,\ -\overset{O}{\underset{\|}{C}}-NR^1-,$$

$$\text{or } -NR^1-\overset{O}{\underset{\|}{C}}- \text{ group};$$

each R is independently hydrogen or a hydrocarbyl or hydrocarbyloxy group having from 1 to about 10 carbon atoms, a halogen atom, a nitro group, a nitroso group, a nitrile group, a phenyl group or a —CO—$R^1$ group; each $R^1$ is independently hydrogen or a hydrocarbyl group having 1 to about 3 carbon atoms; one Y is a —SH group and the other Y becomes a R group and one or more of the groups represented by R is a nitro or nitroso group; n is zero or 1; n' has a value from 1 to about 6; z has a value of one or two; $p^1$ has a value from 1 to about 30; and the aromatic rings can optionally contain one or more heteroatoms selected from the group consisting of N, O and S; with the proviso that at least 80% of the molecules are para substituted by the bridging groups (—A— in Formulas XXI and XXII, the direct bond in Formula XXIV and the mercaptan group (—SH).

12. A nitro or nitroso group terminated adduct of claim 11 wherein component (B) is 4-mercapto-4'-nitrobiphenyl, 4-mercapto-4'-nitrostilbene, 4-mercapto-4'-nitrodiphenylazomethine, 4-mercapto-4'-nitroazoxybenzene, 4-mercapto-4'-nitrobenzanilide, 4-nitro-4'-mercaptobenzanilide, 4-mercaptophenyl-4'-nitrobenzoate, 4-mercapto-4'-nitro-alpha-chlorostilbene, or any combination thereof.

13. A nitro or nitroso group terminated adduct of claim 5 wherein component (B) is a nitro or nitroso secondary monoamine represented by the following Formulas XXI, XXIII or XXIV

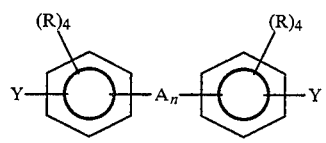

Formula XXI.

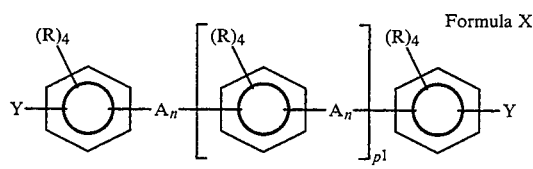

Formula XXIII.

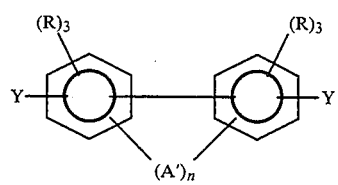

Formula XXIV.

wherein each A is independently selected from the group consisting of a direct single bond, —CR$^1$=CR$^1$—, —C≡C—, —N=N—, —CR$^1$=N—, —O—CO—, —NR$^1$—CO—, —CR$^1$=N—N=CR$^1$—, —CR$^1$=CR$^1$—CO—, —N=CR$^1$—, —CO—O—, —CO—NR$^1$—, —CO—CR$^1$=CR$^1$—, —CO—O—N=CR$^1$, —CR$^1$=N—O—OC—, —CO—NR$^1$—NR$^1$—OC—, —CR$^1$=CR$^1$—O—OC—, —CO—O—CR$^1$=CR$^1$—, —O—OC—CR$^1$=CR$^1$—, —CR$^1$=CR$^1$—CO—O—, —(CHR$^1$)$_{n'}$—O—CO—CR$^1$=CR$^1$—, —CR$^1$=CR$^1$—CO—O—(CHR$^1$)$_{n'}$—, —(CHR$^1$)$_{n'}$—CO—O—CR$^1$CR$^1$—, —CR$^1$=CR$^1$—O—CO—(CHR$^1$)$_{n'}$—, —CO—S—, —S—OC—, —CH$_2$—CH$_2$—CO—O—, —O—OC—CH$_2$—CH$_2$—, —C≡C—C≡C—, —CR$^1$=CR$^1$—CR$^1$=CR$^1$—,

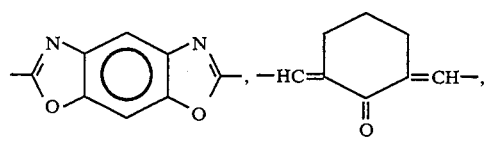

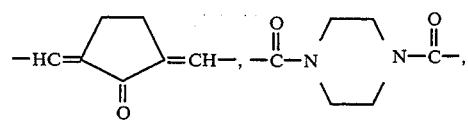

-continued

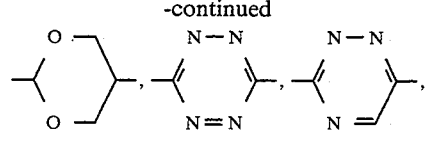

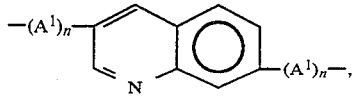

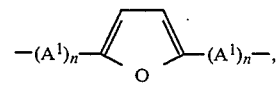

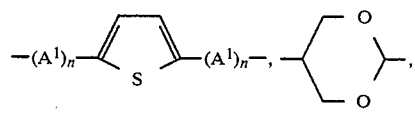

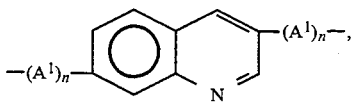

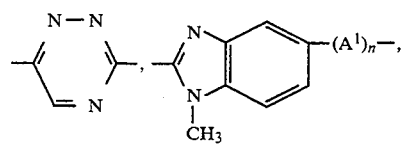

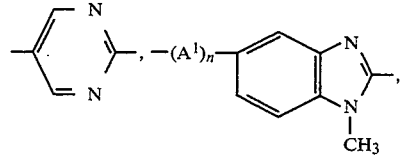

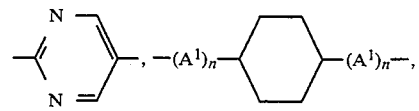

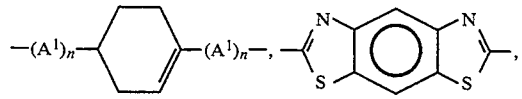

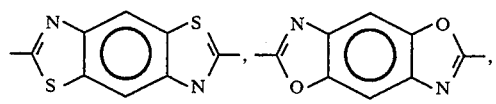

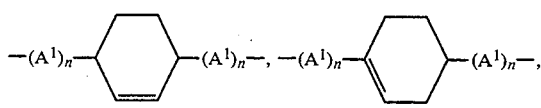

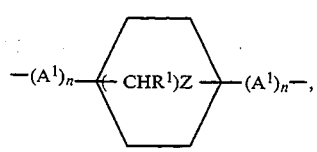

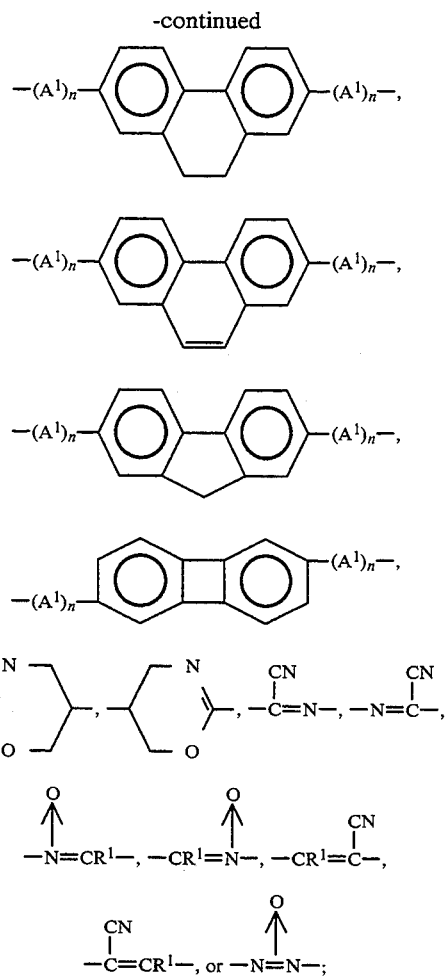

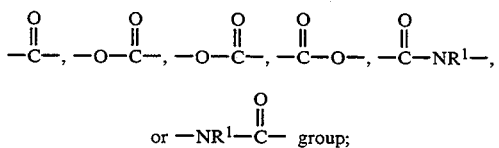

A' is a divalent hydrocarbyl group having from 1 to about 10 carbon atoms and A' in Formula XXIV can also contain one or more heteroatoms selected from N, O and S any may be saturated or unsaturated; each $A^1$ is independently a $$-\overset{O}{\underset{\|}{C}}-,\ -O-\overset{O}{\underset{\|}{C}}-,\ -O-\overset{O}{\underset{\|}{C}}-,\ -\overset{O}{\underset{\|}{C}}-O-,\ -\overset{O}{\underset{\|}{C}}-NR^1-,$$

or $-NR^1-\overset{O}{\underset{\|}{C}}-$ group;

one Y is a $-NHR^4$ group and the other Y becomes a R group and one or more of the groups represented by R is a nitro or nitroso group; $R^4$ is a hydrocarbyl group having from 1 to about 12 carbon atoms; each R is independently hydrogen or a hydrocarbyl or hydrocarbyloxy group having from 1 to about 10 carbon atoms, a halogen atom, a nitro group, a nitroso group, a nitrile group, a phenyl group or a $-CO-R^1$ group; each R1 is independently hydrogen or a hydrocarbyl group having 1 to about 3 carbon atoms; n is zero or 1; n' has a value from 1 to about 6; z has a value of one or two; $p^1$ has a value from 1 to about 30; and the aromatic rings can optionally contain one or more heteroatoms selected from the group consisting of N, O and S; with the proviso that at least 80% of the molecules are para substituted by both the bridging groups (—A— in Formulas XXI and XXIII, the direct bond in Formula XXIV) and the amino groups (—NHR⁴).

14. A nitro or nitroso group terminated adduct of claim 13 wherein component (B) is 4-N-methylamino-4'-nitrobiphenyl, 4-N-methylamino-4'-nitrostilbene, 4-N-methylamino-4'-nitrodiphenylazomethine, 4-N-methylamino-4'-nitroazoxybenzene, 4-N-methylamino-4'-nitrobenzanilide, 4-nitro-4'-N-methylaminobenzanilide, 4-N-methylaminophenyl-4'-nitrobenzoate, 4-N-methylamino-4'-nitro-alpha-chlorostilbene, or any combination thereof.

15. A nitro or nitroso group terminated adduct of claim 1 wherein both of the components (A) and (B) contain a compound which has at least one rodlike mesogenic moiety per molecule.

16. A nitro or nitroso group terminated adduct of claim 15 wherein
  (a) component (A) is an epoxy resin containing at least one rodlike mesogenic moiety selected from the same group as those in claim 3; and
  (b) component (B) is a single active hydrogen containing compound containing one or more nitro (nitroso) groups and at least one rodlike mesogenic moiety selected from the same group as those in claim 6.

17. An adduct of claim 16 wherein
  (a) component (A) is selected from the group consisting of the diglycidyl ethers of: 4,4'-dihydroxy-α-methylstilbene, 4,4'-dihydroxystilbene, 4,4'-dihydroxybenzanilide, 4,4'-dihydroxybiphenyl, 4-hydroxyphenyl-4-hydroxybenzoate, N,N'-bis(4-hydroxyphenyl)terephthalamide, bis(4-hydroxyphenyl)terephthalate, and any combination thereof; and
  (b) component (B) is selected from the group consisting of 4-hydroxy- 4'-nitrobiphenyl, 4-hydroxy-4'-nitrostilbene, 4-hydroxy-4'-nitrodiphenylazomethine, 4-hydoxy-4'-nitroazoxybenzene, 4-hydroxy-4'-nitrobenzanilide, 4-nitro-4'-hydroxybenzanilide, 4-hydroxyphenyl-4'-nitrobenzoate, 4-hydroxy-4'-nitro-alpha-chlorostilbene, 4-carboxy-4'-nitrobiphenyl, 4-carboxy-4'-nitrostilbene, 4-carboxy-4'-nitrodiphenylazomethine, 4-carboxy-4'-nitroazoxybenzene, 4-carboxy-4'-nitrobenzanilide, 4-nitro-4'-carboxybenzanilide, 4-carboxyphenyl-4'-nitrobenzoate, 4-carboxy-4'-nitro-alpha-chlorostilbene, 4-mercapto-4'-nitrobiphenyl, 4-mercapto-4'-nitrostilbene, 4-mercapto-4'-nitrodiphenylazomethine, 4-mercapto-4'-nitroazoxybenzene, 4-mercapto-4'-nitrobenzanilide, 4-nitro-4'-mercaptobenzanilide, 4-mercaptophenyl-4'-nitrobenzoate, 4-mercapto-4'-nitro-alpha-chlorostilbene, 4-N-methylamino-4'-nitrobiphenyl, 4-N-methylamino-4'-nitrostilbene, 4-N-methylamino-4'-nitrodiphenylazomethine, 4-N-methylamino-4'-nitroazoxybenzene, 4-N-methylamino-4'-nitrobenzanilide, 4-nitro-4'-N-methylaminobenzanilide, 4-N-emthylaminophenyl-4'-nitrobenzoate, 4-N-methylamino-4'-nitro-alpha-chlorostilbene, or any combination thereof.

* * * * *